United States Patent [19]
Moriya

[11] Patent Number: 5,900,549
[45] Date of Patent: May 4, 1999

[54] ANGULAR VELOCITY SENSOR

[75] Inventor: Kazufumi Moriya, Yokohama, Japan

[73] Assignee: Murata Manufacturing Co., Ltd., Japan

[21] Appl. No.: 08/760,972

[22] Filed: Dec. 5, 1996

[30] Foreign Application Priority Data

Dec. 5, 1995 [JP] Japan .................................... 7-344474

[51] Int. Cl.⁶ ...................................................... H01P 9/04
[52] U.S. Cl. ...................................................... 73/504.12
[58] Field of Search ........................... 73/504.12, 504.14, 73/504.15, 504.16, 504.04

[56] References Cited

U.S. PATENT DOCUMENTS 5,359,893  11/1994  Dunn .......................................... 73/505
5,447,068   9/1995  Tang .......................................... 73/514.32

FOREIGN PATENT DOCUMENTS 634629  1/1995  European Pat. Off. .
6-123632  5/1994  Japan .

*Primary Examiner*—John E. Chapman
*Attorney, Agent, or Firm*—Ostrolenk, Faber, Gerb & Soffen, LLP

[57] ABSTRACT

An angular velocity sensor includes a movable bi-directional electrode and a fixed bi-directional electrode wherein L-shaped electrode plates of the movable bi-directional vibration-urging electrode mesh in spaced relationship with L-shaped electrode plates of the fixed bi-directional electrode. In one embodiment in response to a vibration driving signal applied between the electrodes, a vibration plate vibrates with a large amplitude in one direction parallel to the direction in which bent parts of the L-shaped electrode plates extend. If an angular velocity $\Omega_Z$ about the Z axis is applied to the vibration plate, the vibration plate is greatly displaced in the Y direction by Coriolis force. This displacement is detected by a displacement detecting part with high accuracy. In another embodiment, the bi-directional electrodes serve as the displacement detecting part.

15 Claims, 18 Drawing Sheets

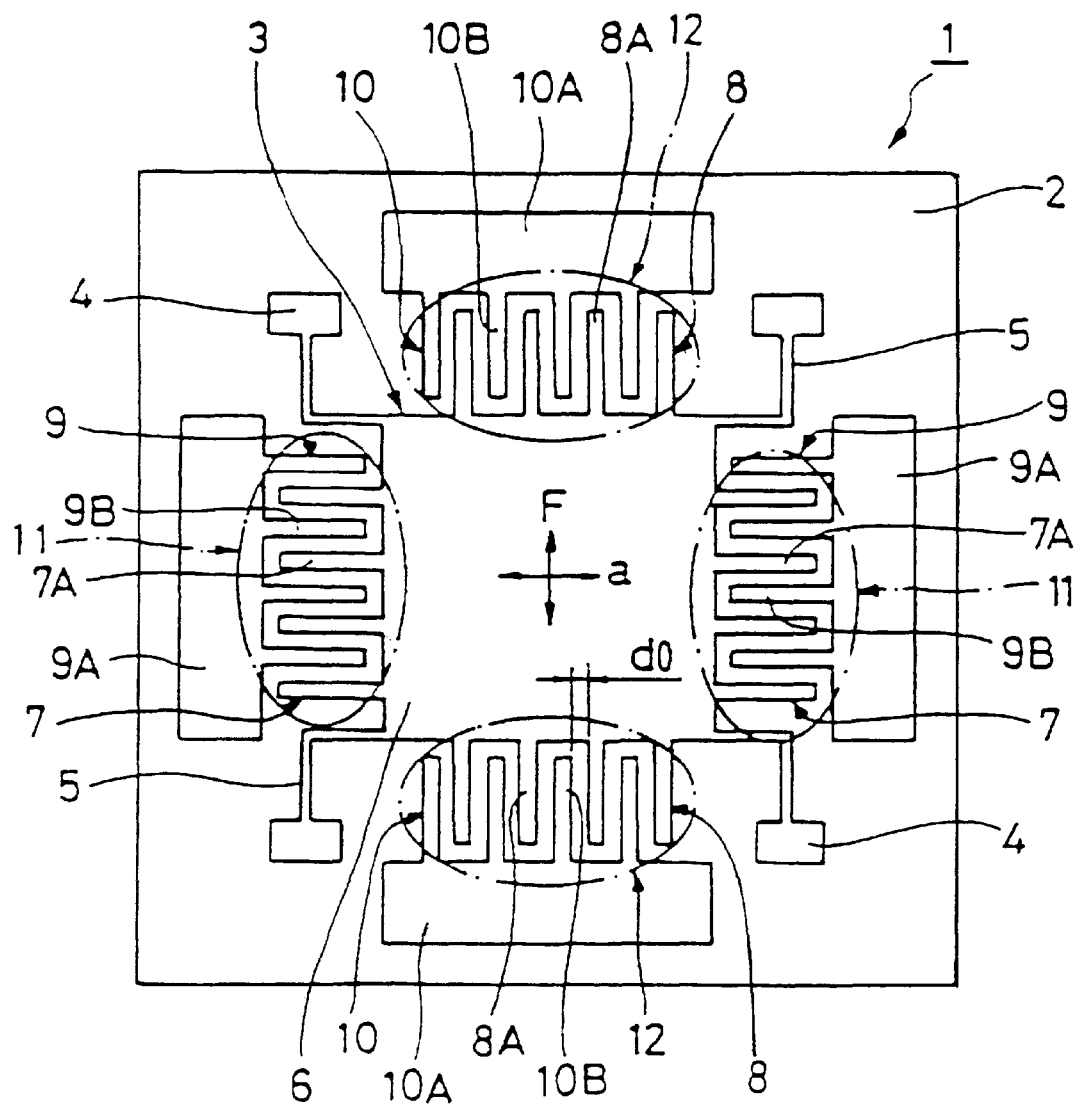

ANGULAR VELOCITY SENSOR

BACKGROUND OF THE INVENTION

1. Field of the Invention

The present invention relates to an angular velocity sensor for detecting the angular velocity of a rotating body.

2. Description of the Related Arts

In operation of an angular velocity sensor, the vibration plate of the angular velocity sensor is vibrated in any direction selected from three directions including X, Y, and Z directions. When the vibration plate is vibrating with a constant amplitude for example in the X direction, if the angular velocity sensor is rotated about the Z axis, a Coriolis force (inertia force) acts on the vibration plate, which causes the vibration plate to be displaced in the Y direction. The above displacement of the vibration plate in the Y direction caused by the Coriolis force is detected by detecting the change in capacitance or piezoresistance. Various angular velocity sensors, one-side or both-side supporting type, such as those disclosed in Japanese Unexamined Patent Publications Nos. 61-139719, 61-114123 and 6-123632 are widely used.

Of these various conventional angular velocity sensors, the angular velocity sensor disclosed in Japanese Unexamined Patent Publication No. 6-123632 is shown in FIGS. 17 and 18.

As shown in FIGS. 17 and 18, the angular velocity sensor 1 has a substrate 2 or a main body formed into a rectangular shape. The substrate 2 is made up for example of silicon having a high resistance.

A movable member 3 is disposed on the substrate 2, wherein the movable member 3 is formed of low-resistance polysilicon or single-crystal silicon doped with P, B, or Sb. The movable member 3 includes: four fixing parts 4, 4, . . . formed on the substrate 2, at the respective four corners; four L-shaped supporting beams 5, 5, . . . each extending from the corresponding supporting element 4 and each having a part extending in parallel to the X axis and a part extending in parallel to the Y axis; and a vibration plate 6 which is supported by the four supporting beams 5 such that the vibration plate 6 is spaced from the surface of the substrate 2 and can move in the X and Y directions. Movable comb-shaped vibration-urging electrodes 7, 7 are formed on the front and rear side faces, respectively, of the vibration plate 6, wherein the front and rear side faces refer to those side faces perpendicular to the X direction. Each movable comb-shaped vibration-urging electrode 7 includes a plurality of electrode plates 7A, 7A, . . . (four electrode plates in the specific example shown in FIGS. 17 and 18) projecting from each of these side faces. Movable comb-shaped detection electrodes 8, 8 are formed on the left and right side faces, respectively, of the vibration plate 6, wherein the left and right side faces refer to those side faces perpendicular to the Y direction. Each movable comb-shaped detection electrode 8 includes a plurality of electrode plates 8A, 8A, . . . (four electrode plates in the specific example shown in FIGS. 17 and 18) projecting from each of these side faces.

Of various portions of the movable member 3, only the fixing parts 4 are firmly connected to the substrate 2, and the other portions including the vibration plate 6 and the supporting beams 5 are supported at four points such that they are spaced a predetermined distance apart from the substrate 2. Since the vibration plate 6 is supported by the supporting beam 5 each having an L shape, the vibration plate 6 can move in the X direction with the part parallel to the Y axis of the L-shaped supporting beam 5 being bent. Similarly, the vibration plate 6 can move in the Y direction with the part parallel to the X axis of the L-shaped supporting beam 5 being bent.

The angular velocity sensor 1 also has a pair of fixed comb-shaped vibration-urging electrodes 9,9 which are formed on the substrate 2 at the front and rear sides of the vibration plate 6 such that the vibration plate 6 is interposed between these fixed comb-shaped vibration-urging electrodes. Each fixed comb-shaped vibration-urging electrode 9 includes: a fixed part 9A formed on the substrate 2, in front of or at the back of the vibration plate 6; and four electrode plates 9B, 9B, . . . extending from each fixed part 9A in parallel to and apart from the corresponding electrode plates 7A of the movable comb-shaped vibration-urging electrode 7.

The angular velocity sensor 1 also has a pair of fixed comb-shaped detection electrodes 10,10 which are formed on the substrate 2 at its left and right sides, respectively, such that the vibration plate 6 is interposed between these fixed comb-shaped detection electrodes. Each fixed comb-shaped detection electrode 10 includes: a fixed part 10A formed on the substrate 2, adjacent to the left or right end of the vibration plate 6; and four electrode plates 10B, 10B, . . . extending from each fixed part 10A in parallel to and apart from the corresponding electrode plates 8A of the movable comb-shaped detection electrode 8.

Reference numerals 11,11 denote two vibration generating parts serving as vibration generating means each formed with one movable comb-shaped vibration-urging electrode 7 and one fixed comb-shaped vibration-urging electrode 9. The electrode plates 7A of each movable comb-shaped vibration-urging electrode 7 are equally spaced from the respective electrode plates 9B of the corresponding fixed comb-shaped vibration-urging electrode 9. If vibration driving signals with a frequency f are applied between the movable comb-shaped vibration-urging electrodes 7 and the fixed comb-shaped vibration-urging electrodes 9 such that the signals applied to electrodes at the front and left sides are opposite in phase to each other, then electrostatic attraction occurs between the electrode plates 7A and 9B alternately at the front and rear sides, and thus attraction and repulsion occur alternately and periodically at each vibration generating part 11. As a result, the vibration plate 6 vibrates in a direction denoted by the arrow a, i.e., the X direction.

Reference numerals 12,12 denote two displacement detecting parts serving as displacement detecting means each formed with one movable comb-shaped detection electrode 8 and one fixed comb-shaped detection electrode 10. There are provided gaps do between the electrode plates 8A of the movable comb-shaped detection electrode 8 and the adjacent electrode plates 10B of the fixed comb-shaped detection electrode 10. The above electrodes 8 and 10 form a parallel-plate detection capacitor. Each displacement detecting part 12 detects the change in the effective area between the electrode plates 8A and 10B by detecting the corresponding change in capacitance.

In the angular velocity sensor 1 having the above structure, if vibration driving signals having opposite phases are applied to the respective vibration generating parts 11, then electrostatic attraction between the electrode plates 7A and 9B occurs alternately in the vibration generating parts 11 at the front and rear sides. As a result the vibration plate 6 is displaced alternately forward and backward in the X direction denoted by the arrow a, and thus the vibration plate 6 vibrates in the X direction.

When the angular velocity sensor 1 is vibrating in the above-described manner, if an angular velocity n about the Z axis is applied to the angular velocity sensor 1, a Coriolis force (inertia force) having a magnitude given by equation 2 shown below is generated in the Y direction. The Coriolis force causes the vibration plate 6 to vibrate in the Y direction.

In the vibrating operation of the vibration plate 6 generated by the vibration generating parts 11, the displacement x in the X direction and its velocity V are given by:

$$x = A \cdot \sin((2\pi f)t)$$

$$V = A(2\pi f)\cos((2\pi f)t) \qquad (1)$$

where A is the amplitude of the vibration of the vibration plate 6, and f is the frequency of the vibration driving signal.

The Coriolis force F, which occurs when an angular velocity $\Omega$ about the Z axis is applied to the vibration plate 6 vibrating with the displacement x and the velocity V described above, is given as:

$$\begin{aligned} F &= 2m\Omega V \qquad (2)\\ &= 2m\Omega A(2\pi f)\cos((2\pi f)t) \end{aligned}$$

where m is the mass of the vibration plate 6.

The Coriolis force F represented by equation 2 causes the vibration plate 6 to vibrate in the Y direction. The vibrating displacement of the vibration plate 6 results in a change in the capacitance between the movable comb-shaped detection electrode 8 and the fixed comb-shaped detection electrode 10 in each displacement detecting part 12. Thus the angular velocity $\Omega$ about the Z axis can be determined by detecting the above change in the capacitance.

As described above, each vibration generating part 11 is formed with the electrode plates 7A of the movable comb-shaped vibration-urging electrode 7 and the electrode plates 9B of the fixed comb-shaped vibration-urging electrode 9 such that the electrode plates 7 and 9 can effectively have a large facing area, which allows the electrode plates 7A and 9B to have a great electrostatic attractive force in response to the vibration driving signal applied to each vibration generating part 11 thereby allowing the vibration plate 6 to vibrate with a large amplitude in the direction denoted by the arrow a.

Similarly, each displacement detecting part 12 is formed with the electrode plates 8A of the movable comb-shaped detection electrode 8 and the electrode plates 10B of the fixed comb-shaped detection electrode 10 such that the electrodes 8 and 10 effectively have a large facing area. As a result, each displacement detecting part 12 can detect the displacement of the vibration plate 6 in the Y direction by detecting the change in the capacitance corresponding to the change in the effective area between the electrode plates 8A and 10B.

As can be understood from equation 2, the detection sensitivity of the angular velocity sensor 1 having the above-described structure can be improved by increasing the vibration amplitude A of the vibration plate 6. The increase in the vibration amplitude can be achieved for example by increasing the voltage of the vibration driving signal applied to the vibration generating parts 11.

However, the maximum possible vibration amplitude A of the vibration plate 6 in the X direction is limited by the gap d0 between the electrode plates 8A and 10B of each displacement detecting part 12. Therefore, to increase the vibration amplitude A of the vibration plate 6, it is required to increase the gap d0. However, if the gap d0 between the electrode plates 8A and 10B is increased, the capacitance detected by each displacement detecting part 12 decreases in inverse proportion to the gap do.

As described above, if it is attempted to increase the detection sensitivity of the conventional angular velocity sensor having the above structure by increasing the gap d0, a reduction in the detection capacitance occurs. On the other hand, if the gap d0 is decreased, it becomes impossible to obtain a large vibration amplitude A. Thus, in the above-described structure employed in the conventional angular velocity sensor, it is difficult to improve the detection sensitivity by making a simple modification in the design parameters.

SUMMARY OF THE INVENTION

It is a general object of the present invention to solve the above problems. More specifically, it is an object of the present invention to provide an angular velocity sensor with a vibration plate capable of vibrating with a large amplitude and thus having a high detection sensitivity.

In the present invention, an angular velocity sensor generally includes a substrate; a supporting beam whose base end is fixed to the substrate; a vibration plate which is connected to the other end of the supporting beam and is spaced from the surface of the substrate so that the vibration plate can move in the X and Y directions; vibration generating means or part for vibrating the vibration plate either in the X direction or in the Y direction; and displacement detecting means or part for detecting a displacement which occurs either in the X direction or in the Y direction different from the direction in which the vibration plate is vibrated in response to the change in the angular velocity applied to the vibration plate being vibrated in either the X or Y direction by the vibration generating means.

More specifically, in an aspect of the present invention, at least one of the vibration generating means or part and the displacement detecting means or part includes: a movable bi-directional electrode including a part extending in the X direction and a part extending in the Y direction, the movable bi-directional electrode being formed on at least one side of the vibration plate in such a manner that it projects from the at least one side of the vibration plate; and a fixed bi-directional electrode including a part extending in the X direction and a part extending in the Y direction, the fixed bi-directional electrode being formed on the substrate in such a manner that the fixed bi-directional electrode faces via a space the movable bi-directional electrode, and the displacement detecting means comprises: a movable comb-shaped electrode formed on at least one of the remaining sides, orthogonal to the at least one side on which the movable bi-directional electrode is formed, the movable comb-shaped electrode projecting from the at least one side of the vibration plate; and a fixed comb-shaped electrode formed on the substrate in such a manner that the fixed comb-shaped electrode faces via a space the movable comb-shaped electrode.

With the above arrangement, if a vibration driving signal is applied between the movable bi-directional electrode and the fixed bi-directional electrode of the vibration generating means, electrostatic force occurs between the facing X-extending and Y-extending parts of the movable and fixed bi-directional electrodes. The electrostatic force causes the movable bi-directional electrode to move alternately close to and apart from the fixed bi-directional electrode. As a result, the vibration plate vibrates either in the X direction or in the Y direction. On the other hand, since the displacement detecting means is provided for detecting the displacement of the vibration plate by detecting the change in the capacitance between the movable comb-shaped electrode formed on the vibration plate and the fixed comb-shaped electrode, if an angular velocity about the Z axis is applied to the vibration plate when the vibration plate is being vibrated for example in the X direction, then the vibration plate is displaced in the Y direction in response to the angular velocity and this displacement is detected by the displacement detecting means. Thus, the angular velocity about the Z axis can be detected. Furthermore, since the movable comb-shaped electrode and the fixed comb-shaped electrode in the displacement detecting means each have parts extending in the same direction as that in which the vibration plate is vibrated by the vibration generating means, the vibration amplitude of the vibration plate is not limited by the comb-shaped electrodes forming the displacement detecting means.

In another aspect of the present invention, the displacement detecting means or part includes: a movable bi-directional electrode including a part extending in the X direction and a part extending in the Y direction, the movable bi-directional electrode being formed on at least one side of the vibration plate in such a manner that it projects from the at least one side of the vibration plate; and a fixed bi-directional electrode including a part extending in the X direction and a part extending in the Y direction, the fixed bi-directional electrode being formed on the substrate in such a manner that the fixed bi-directional electrode faces via a space the movable bi-directional electrode; and the vibration generating means includes: a movable comb-shaped electrode formed on at least one of the remaining sides, orthogonal to the at least one side on which the movable bi-directional electrode is formed, the movable comb-shaped electrode projecting from the at least one side of the vibration plate; and a fixed comb-shaped electrode formed on the substrate in such a manner that the fixed comb-shaped electrode faces via a space the movable comb-shaped electrode.

With the above arrangement, if a vibration driving signal is applied between the movable comb-shaped electrode and the fixed comb-shaped electrode of the vibration generating means, electrostatic force occurs between the facing X-extending and Y-extending parts of the movable and fixed comb-shaped electrodes. The electrostatic force causes the movable comb-shaped electrode to move alternately close to and apart from the fixed comb-shaped electrode. As a result, the vibration plate vibrates either in the X direction or in the Y direction. On the other hand, since the displacement detecting means is provided for detecting the displacement of the vibration plate by detecting the change in the capacitance between the movable bi-directional electrode formed on the vibration plate and the fixed bi-directional electrode, if an angular velocity about the Z axis is applied to the vibration plate when the vibration plate is being vibrated for example in the X direction, then the vibration plate is displaced in the Y direction in response to the angular velocity and this displacement is detected by the displacement detecting means. Thus, the angular velocity about the Z axis can be detected. Furthermore, since the movable bi-directional electrode and the fixed bi-directional electrode in the displacement detecting means each have parts extending in the same direction as that in which the vibration plate is vibrated by the vibration generating means, the vibration amplitude of the vibration plate is not limited by the bi-directional electrodes forming the displacement detecting means.

In still another aspect of the present invention, the vibration plate includes an outer frame and a vibration element which is disposed inside the outer frame via a connection beam in such a manner that the vibration element can move in the Z direction; and the angular velocity sensor further includes a Z-direction displacement detecting means formed with a movable electrode formed on the vibration element and a fixed electrode formed on the substrate such that the fixed electrode and the movable electrode face each other via a space, whereby the Z-direction displacement detecting means detects a displacement of the vibration element in the Z direction corresponding to a change in angular velocity applied to the vibration plate which is vibrated either in the X direction or in the Y direction by the vibration generating means.

With the above arrangement, if an angular velocity about the Y axis is applied to the vibration plate which is being vibrated for example in the X direction by the vibration generating means, then the vibration element is displaced in the Z direction in response to the angular velocity. The Z-direction displacement detecting means detects the above displacement by detecting the change in capacitance corresponding to the gap between the movable electrode formed on the vibration element and the fixed electrode formed on the substrate.

In a further aspect of the present invention, the movable bi-directional electrode and the fixed bi-directional electrode each include a plurality of electrode plates each including a part extending in the X direction and a part extending in the Y direction, wherein the plurality of electrode plates of the movable bi-directional electrode face via a space the plurality of electrode plates of the fixed bi-directional electrode. In the case where the movable bi-directional electrode and the fixed bi-directional electrode are used as the vibration generating means, if a vibration driving signal is applied between these electrodes, then electrostatic force occurs between the electrodes and thus the vibration plate vibrates in the X direction. In the case where the movable bi-directional electrode and the fixed bi-directional electrode are used as the displacement detecting means, the displacement detecting means can detect the change in capacitance corresponding to the change in the gap between the above electrodes.

In another aspect of the present invention, the plurality of electrode plates of the movable bi-directional electrode and the plurality of electrode plates of the fixed bi-directional electrode each includes: a projection part serving as the part extending in the Y direction and projecting from the vibration plate; and a bent part serving as the part extending in the X direction and being bent at the end of the projection part.

In the above structure, the electrode plates of the movable bi-directional electrode and the electrode plates of the fixed bi-directional electrode are disposed such that these electrode plates mesh each other via spaces. In the case where the movable bi-directional electrode and the fixed bi-directional electrode are used as the vibration generating means, if a vibration driving signal is applied between the movable bi-directional electrode and the fixed bi-directional electrode, electrostatic force is generated between the projection parts of the electrode plates of the movable bi-directional electrode and the adjacent projection parts of the electrode plates of the fixed bi-directional electrode and also between the bent parts of the electrode plates of the movable bi-directional electrode and the bent parts of the electrode plates of the fixed bi-directional electrode. The electrostatic force causes the movable bi-directional electrode to move with respect to the fixed bi-directional electrode in the same direction as that in which the bent parts extend, and thus the vibration plate vibrates in the X direction. On the other hand, when the movable bi-directional electrode and the fixed bi-directional electrode are used as the displacement detecting means, the displacement detecting means can detect the change in the gap between the bent parts of the electrode plates of the movable bi-directional electrode and the adjacent bent parts of the electrode plates of the fixed bi-directional electrode by detecting the corresponding change in capacitance.

In still another aspect of the present invention, there are provided two vibration generating means of the type described above, located separately on two parallel sides of the vibration plate. This arrangement allows the movable bi-directional electrode formed on the vibration plate and the fixed bi-directional electrode formed on the substrate to have a larger effective area. This allows the vibration generating means to drive the vibration plate with a larger amplitude in the X direction.

In another aspect of the present invention, there are provided two displacement detecting means of the type described above, located separately on the other two parallel sides of the vibration plate, wherein the other two parallel sides are orthogonal to the sides on which the vibration generating means are disposed. This arrangement allows the movable comb-shaped electrode formed on the vibration plate and the fixed comb-shaped electrode formed on the substrate to have a larger effective area. This leads to an increase in the capacitance detected by the displacement detecting means.

In still another aspect of the present invention, the angular velocity sensor further includes: capacitance detecting means for detecting the displacement caused by the angular velocity by detecting a change in capacitance; and control means for supplying a control signal to the displacement detecting means, the control signal having a value which makes the displacement zero, the value being determined on the basis of the change in capacitance detected by the capacitance detecting means, wherein the capacitance detecting means and the control means are disposed at a stage following the displacement detecting means, whereby the displacement caused by the angular velocity is determined from the control signal output by the control means. The capacitance detecting means and the control means form a servo mechanism which operates to cancel the displacement caused by the angular velocity. When a displacement is going to occur, the control means supplies a control signal to the displacement detecting means so that the electrostatic force produced by the applied control signal cancels the displacement. In this operation, the control signal corresponds to the magnitude of the angular velocity.

BRIEF DESCRIPTION OF THE DRAWINGS

FIG. 18 is a top view of the angular velocity sensor of FIG. 17.

DESCRIPTION OF THE PREFERRED EMBODIMENTS

With reference to specific embodiments, the present invention will be described in greater detail below in conjunction with FIGS. 1 to 16.

Figure 1:
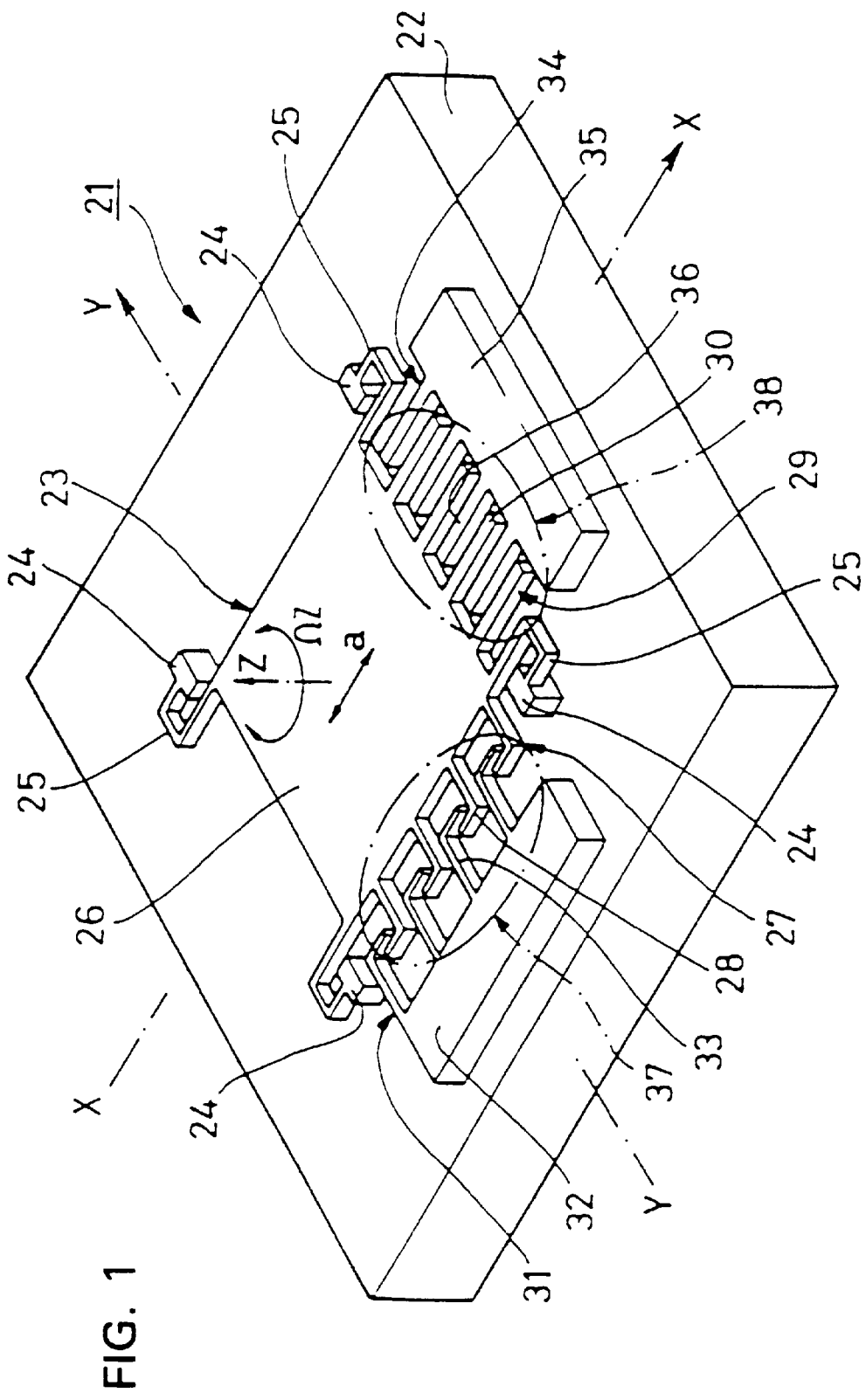
FIG. 1 is a perspective view of a first embodiment of an angular velocity sensor according to the present invention.
Figure 2:
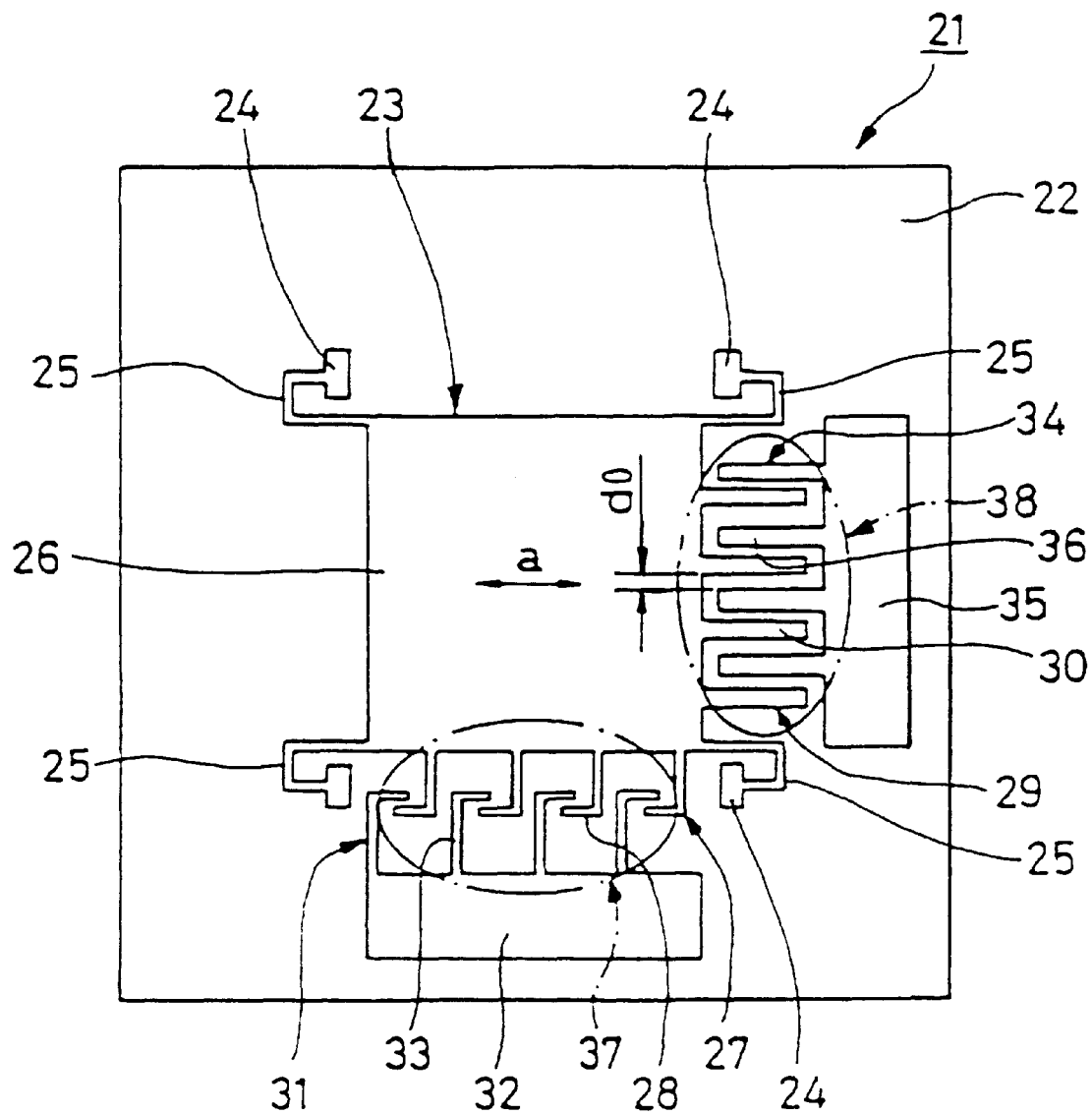
FIG. 2 is a top view of the angular velocity sensor of FIG. 1.
Figure 3:
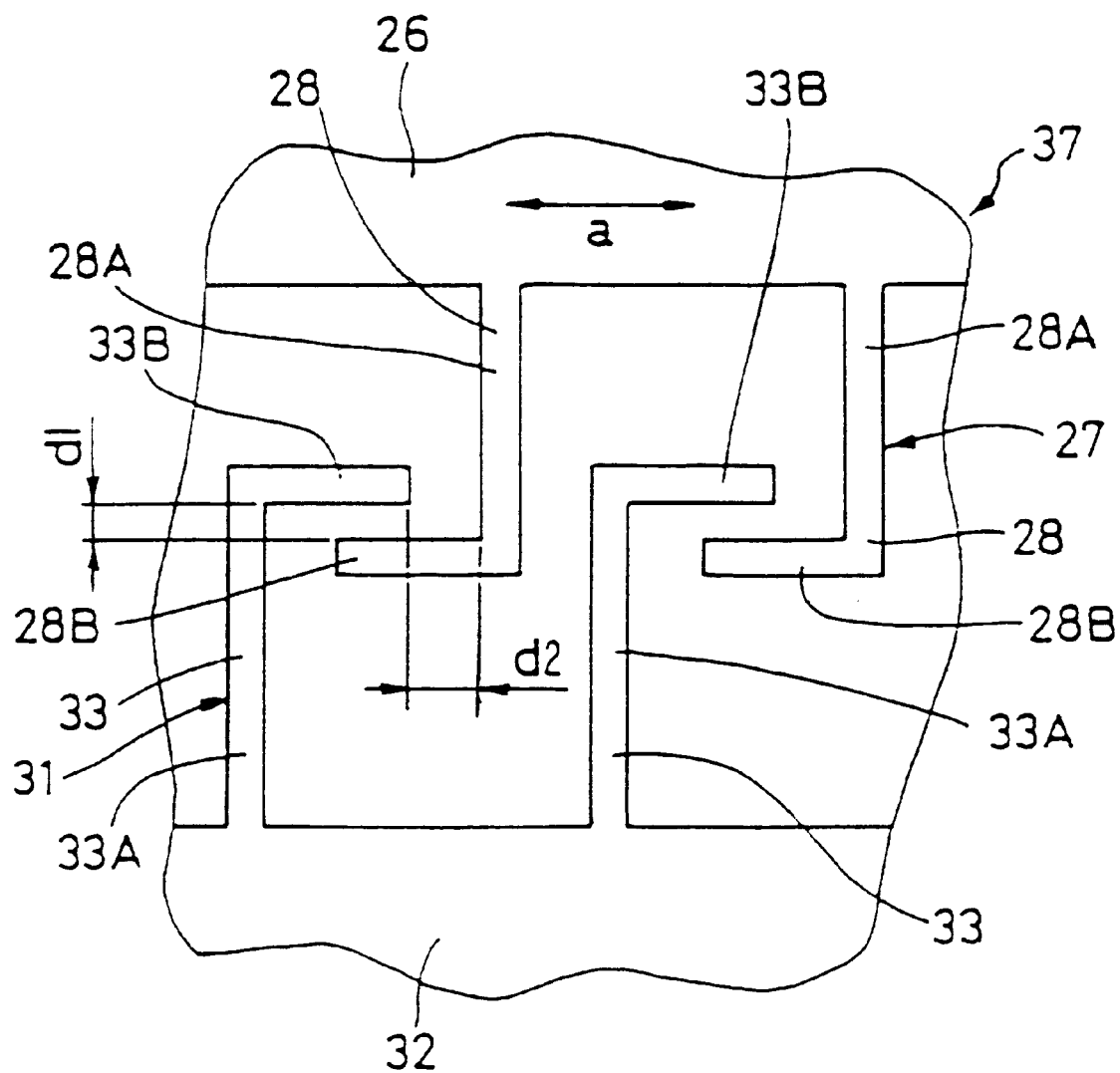
FIG. 3 is an enlarged plan view partially illustrating the angular velocity sensor of FIG. 2.

FIGS. 1 to 3 illustrate a first embodiment of the present invention. In this embodiment, similar or equivalent parts to those of the conventional angular velocity sensor described above will be denoted by the same reference numerals, and they will not be described herein in further detail.

As shown in FIGS. 1 to 3, the angular velocity sensor of the present embodiment, which is generally denoted by reference numeral 21, is formed on a substrate 22 similar to that described above with reference to the conventional technique. The substrate 21 is made up of single-crystal silicon having a high resistance in the form of a rectangular-shaped plate. The substrate 21 has an insulating film (not shown) formed on its surface, wherein the insulating film may be a silicon oxide film, a silicon nitride film, a multi-layer film consisting of a silicon oxide layer and a silicon nitride layer, or the like. For convenience in the following description, the X and Y directions are used to represent two horizontal directions perpendicular to each other associated with the substrate 22, and the vertical direction is defined as the Z direction.

The angular velocity sensor 21 has a movable member 23 disposed on the substrate 22. The movable member 23 is constructed by etching a low-resistance polysilicon film into the form shown in FIG. 1. The movable member 23 includes a vibration plate 26 which is supported by four supporting beams 25 in such a manner that the vibration plate 26 can move in the X and Y directions, wherein the base end portion of each supporting beam 25 is connected to the corresponding one of four fixing parts 24 formed on the four corners of the substrate 22, and each supporting beam 25 extends from the base end portion toward the vibration plate 26. As will be described in further detail later, a movable bi-directional vibration-urging electrode 27 and a movable comb-shaped detection electrode 29 are formed on two orthogonal sides of the vibration plate 26. Of various portions of the movable member 23, only the fixing parts 24 are firmly connected to the substrate 22, and the other portions including the vibration plate 26 and the supporting beams 25 are supported such that they are spaced from the substrate 22.

As shown in FIG. 2, one supporting beam 25 extends from each fixing part 24. Each supporting beam 25 is bent 90° twice into a shape consisting of a part extending in the X direction and a part extending in the Y direction as shown in FIG. 1 or 2. With this structure, the vibration plate 26 can move in the Y direction with the X-extending part of each supporting beam 5 being bent. Similarly, the vibration plate 26 can move in the X direction with the Y-extending part of each supporting beam 5 being bent. Thus, the supporting beams 25 allows the vibration plate 26 to move with respect to the substrate 22 in both the X and Y directions.

The movable bi-directional vibration-urging electrode 27 formed on the left side of the vibration plate 26 includes a plurality of (four) L-shaped wedge electrode plates 28. As shown in FIG. 3, each L-shaped wedge electrode plate 28 includes a projection part 28A projecting in the Y direction from the vibration plate 26, and also a bent part 28B extending in the X direction from the end of the projection part 28A.

The movable comb-shaped detection electrode 29 is disposed on the front side of the vibration plate 26 such that the movable comb-shaped detection electrode 29 is orthogonal to the movable bi-directional vibration-urging electrode 27. The movable comb-shaped detection electrode 29 includes a plurality of (four) electrode plates 30.

The angular velocity sensor 21 also has a fixed bi-directional vibration-urging electrode 31 located adjacent to the left side of the vibration plate 26. The fixed bi-directional vibration-urging electrode 31 includes a fixing part 32 formed on the substrate 22 at a location adjacent to the left side of the vibration plate 26, and also a plurality of (four) L-shaped wedge electrode plates 33 projecting from the fixing part 32 wherein each L-shaped wedge electrode plate has a part extending parallel to the corresponding L-shaped wedge electrode plate 28 of the movable bi-directional vibration-urging electrode 27. Each L-shaped wedge electrode plate 33 includes a projection part 33A projecting in the Y direction from the vibration plate 26 toward the vibration plate 26, and also a bent part 33B extending in the X direction from the end of the projection part 33A.

The respective L-shaped electrode plates 33 of the fixed bi-directional vibration-urging electrode 31 mesh with the corresponding L-shaped wedge electrode plates 28 of the movable bi-directional vibration-urging electrode 27 in such a manner that the respective projection parts 33A extend in parallel to and apart from the corresponding projection parts 28A and the respective bent parts 33B extend in parallel to and apart from the corresponding bent parts 28B. Each bent part 33B of the fixed bi-directional vibration-urging electrode 31 is spaced by a gap d1 from the corresponding bent part 28B of the movable bi-directional vibration-urging electrode 27. The end of each bent portion 28B is spaced in the X direction by an amount of a gap d2 from the corresponding projection part 33A. This gap d2 defines the maximum possible vibration amplitude within which the vibration plate 26 can vibrate in the direction denoted by the arrow a.

The angular velocity sensor 21 also has a fixed comb-shaped detection electrode 34 formed on the substrate 22 at a location adjacent to the front side of the vibration plate 26.

The fixed comb-shaped detection electrode 34 includes a fixing part 35 formed on the substrate 22 and also four electrode plates 36 projecting from the fixing part 35 wherein these electrode plates 36 extend in parallel to the corresponding electrode plates 30 of the movable comb-shaped detection electrode 29.

The movable bi-directional vibration-urging electrode 27 and the fixed bi-directional vibration-urging electrode 31 form a vibration generating part serving as vibration generating means 37. If a vibration driving signal with a frequency f is applied to the vibration generating part 37, electrostatic force occurs between the L-shaped electrode plates 28 and 33, which causes the gap d2 to alternately increase and decrease. Thus the vibration plate 26 vibrates in the direction denoted by the arrow a.

The movable comb-shaped detection electrode 29 and the fixed comb-shaped detection electrode 34 form a displacement detecting part serving as displacement detecting means 38. There are provided gaps d0 between electrode plates 30 of the movable comb-shaped detection electrode 29 and the adjacent electrode plates 36 of the fixed comb-shaped detection electrode 34. The above movable comb-shaped detection electrode 29 and the fixed comb-shaped detection electrode 34 form a parallel-plate detection capacitor. The displacement detecting part 38 detects the change in the gap d0 between the electrode plates 30 and 36 by detecting the change in capacitance.

The operation of the angular velocity sensor 21 having the above-described structure will be described below.

When a vibration driving signal is applied to the vibration generating part 37, electrostatic attraction occurs between the L-shaped electrode plates 28 and 33, which causes the vibration plate 26 to vibrate in the direction denoted by the arrow a. If the angular velocity sensor 21 is rotated about the Z axis at an angular velocity $\Omega_Z$ while maintaining the above vibration, a Y-direction Coriolis force acts on the vibration plate 26 which is adapted to move in the Y direction, wherein the Coriolis force is proportional to the angular velocity $\Omega_Z$ and the vibration amplitude of the vibration plate 26.

The above Coriolis force causes the vibration plate 26 to vibrate in the Y direction. In response to the displacement of the vibration plate 26, the distances between the respective electrode plates 36 of the fixed comb-shaped detection electrode 34 and the corresponding electrode plates 30 of the movable comb-shaped detection electrode 29 alternately increase and decrease. Thus, the displacement detecting part 38 can detect the angular velocity $\Omega_Z$ about the Z axis by detecting the change in the distance d0 between the electrode plates 30 and 36 as the change in the capacitance.

In the angular velocity sensor 21 having the above-described structure according to the present embodiment of the invention, the vibration generating part 37 is constructed, as described above, with the movable bi-directional vibration-urging electrode 27 including the L-shaped electrode plates 28 and the fixed bi-directional vibration-urging electrode 31 including the L-shaped electrode plates 33 wherein the bent parts 28B and 33B mesh with each other in such a manner that these bent parts 28B and 33B are spaced from each other and extend in parallel to each other. The above arrangement ensures that the movable bi-directional vibration-urging electrode 27 and the fixed bi-directional vibration-urging electrode 31 have a large effective area. As a result, when a vibration driving signal is applied between the movable bi-directional vibration-urging electrode 27 and the fixed bi-directional vibration-urging electrode 31 of the vibration generating part 37, a large electrostatic attractive force occurs between these electrodes and thus the vibration plate 26 vibrates greatly in the direction denoted by the arrow a.

In the above structure, the maximum possible vibration amplitude of the vibration plate 26 is limited by the gap d2 between the end of the bent portion 28B and the corresponding projection part 33A. Since this gap d2 can be set to a larger value than can be achieved in the conventional structure, the vibration plate 26 can vibrate with a larger amplitude.

As can be understood from the discussion given above in conjunction with equation 2, the increase in the amplitude A results in an increase in the displacement of the vibration plate 26 in the Y direction caused by the Coriolis force. The large displacement in the Y direction of the vibration plate 26 is detected by the detecting part 38, and thus the angular velocity $\Omega_Z$ about the Z axis can be detected with a high sensitivity.

Since the vibration and the displacement of the vibration plate 26 occur in the X and Y directions, respectively, with respect to the horizontal substrate 22, the vibration plate 26 encounters less air resistance. This allows the angular velocity sensor 21 to be used in the atmosphere.

Now, a second embodiment of the present invention will be described below with reference to FIG. 4. In this second embodiment, the angular velocity sensor 21 of the first embodiment described above is combined with a servo mechanism disposed at a stage following the displacement detecting part 38. In this second embodiment, similar or equivalent parts to those of the first embodiment will be denoted by the same reference numerals, and will not be described herein in further detail.

Figure 4:
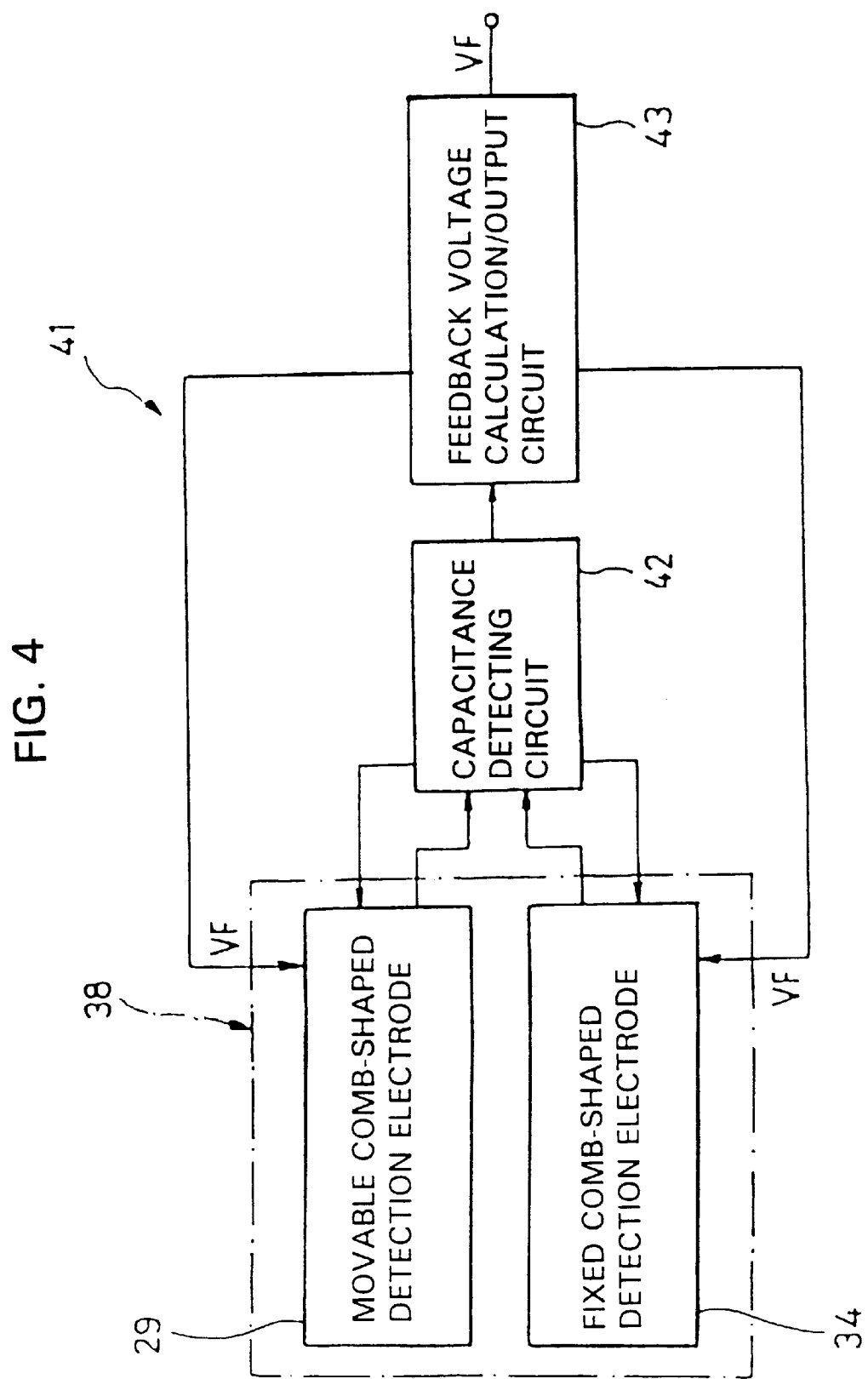
FIG. 4 is a block diagram illustrating the construction of a servo mechanism used in an angular velocity sensor according to a second embodiment of the invention.

In FIG. 4, the servo mechanism of the present embodiment is denoted by reference numeral 41. As shown, the servo mechanism 41 including a capacitance detecting circuit 42 and a feedback voltage calculation/output circuit 43 disposed at the back of the displacement detecting part 38.

The capacitance detecting circuit 42 serves as capacitance detecting means for detecting the change in the gap d0 between the movable comb-shaped detection electrode 29 and the fixed comb-shaped detection electrode 34 of the displacement detecting part 38 by detecting the change in the capacitance between the movable comb-shaped detection electrode 29 and the fixed comb-shaped detection electrode 34. The resultant output signal of the capacitance detecting circuit 42 is supplied to the feedback voltage calculation/output circuit 43.

The feedback voltage calculation/output circuit 43 serves a as control means or circuit for calculating the feedback voltage VF required to make the displacement of the vibration plate 26 zero on the basis of the capacitance signal received from the capacitance detecting circuit 42, and then outputting the calculated voltage VF so that the voltage VF is applied between the movable comb-shaped detection electrode 29 and the fixed comb-shaped detection electrode 34, wherein the feedback voltage VF is proportional to the Coriolis force which causes the vibration plate 26 in the Y direction.

In the angular velocity sensor 21 described above, if an angular velocity $\Omega_Z$ about the Z axis is applied, the Coriolis force due to the angular velocity attempts to displace the vibration plate 26 in the Y direction. However, the displacement in the Y direction is cancelled by the feedback voltage VF which is supplied by the servo mechanism 41 and is applied between the electrodes 29 and 34 of the displacement detecting part 38. Therefore, it is possible to determine the angular velocity $\Omega_Z$ about the Z axis from the feedback voltage VF.

In the present embodiment, as described above, the Coriolis force acting on the vibration plate 26 is determined by detecting the feedback voltage VF which is generated in the servo mechanism to cancel the displacement of the vibration plate 26 in the Y direction. This allows the angular velocity sensor to detect a large displacement regardless of the gap d0 between the movable comb-shaped detection electrode 29 and the fixed comb-shaped detection electrode 34 of the displacement detecting part 38. This technique is particularly useful when coupled with the angular velocity sensor 21 of the type in which the vibration amplitude of the vibration plate 26 in the X direction is increased so as to increase the detection sensitivity of the angular velocity $\Omega_Z$ and thus, if the angular velocity sensor 21 is not coupled with the feedback mechanism of the present embodiment, the displacement of the vibration plate 26 in the Y direction caused by the angular velocity $\Omega_Z$ will exceed the gap d0 between the movable comb-shaped detection electrode 29 and the fixed comb-shaped detection electrode 34 of the displacement detecting part 38.

In this embodiment, therefore, it is possible that the vibration plate 26 can be vibrated with a large amplitude in the direction denoted by the arrow a regardless of the gap d0 between the movable comb-shaped detection electrode 29 and the fixed comb-shaped detection electrode 34 of the displacement detecting part 38. This leads to an improvement in the accuracy of the angular velocity detection.

Figure 5:
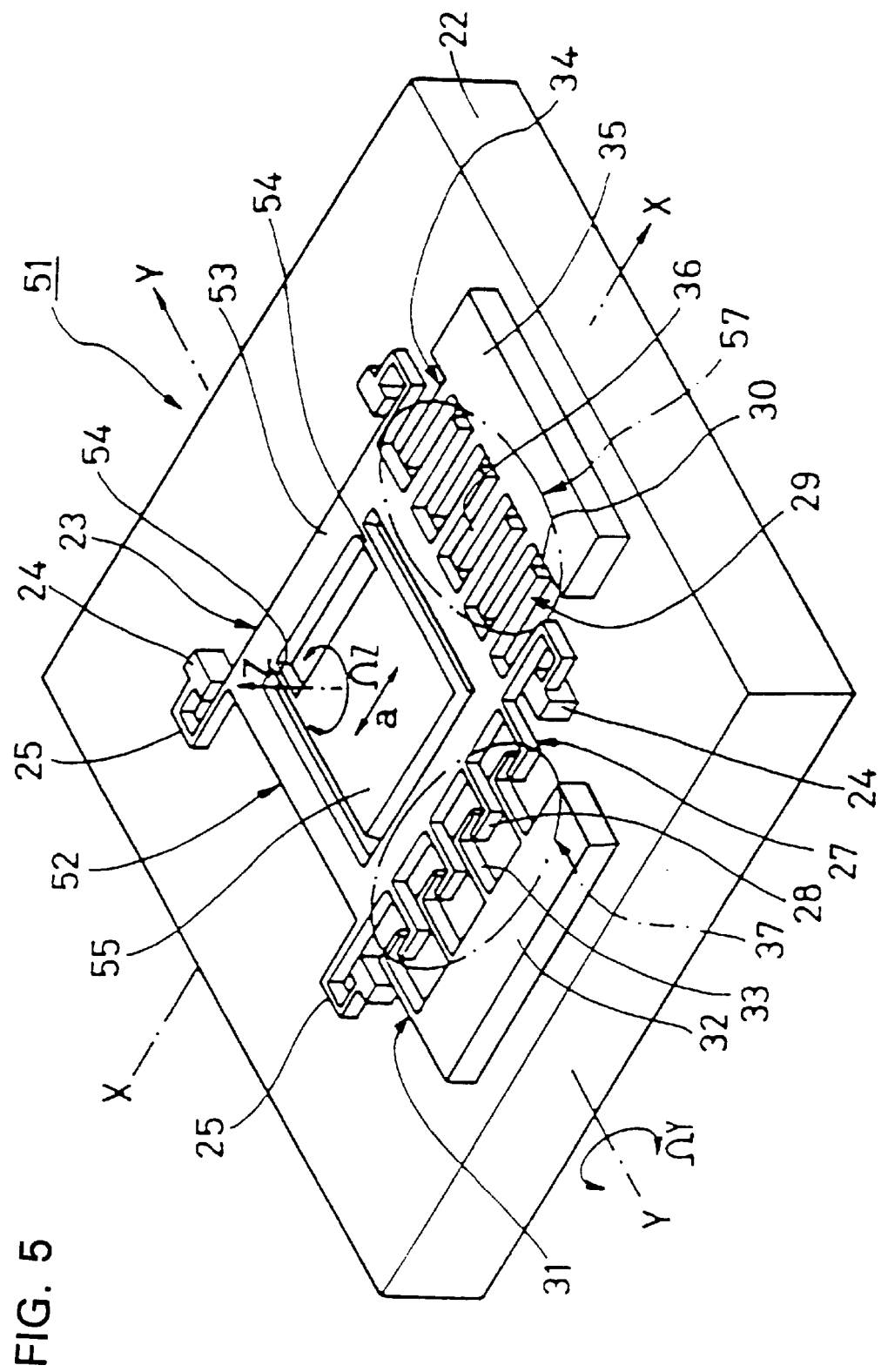
FIG. 5 is a perspective view of a third embodiment of an angular velocity sensor according to the invention.
Figure 6:
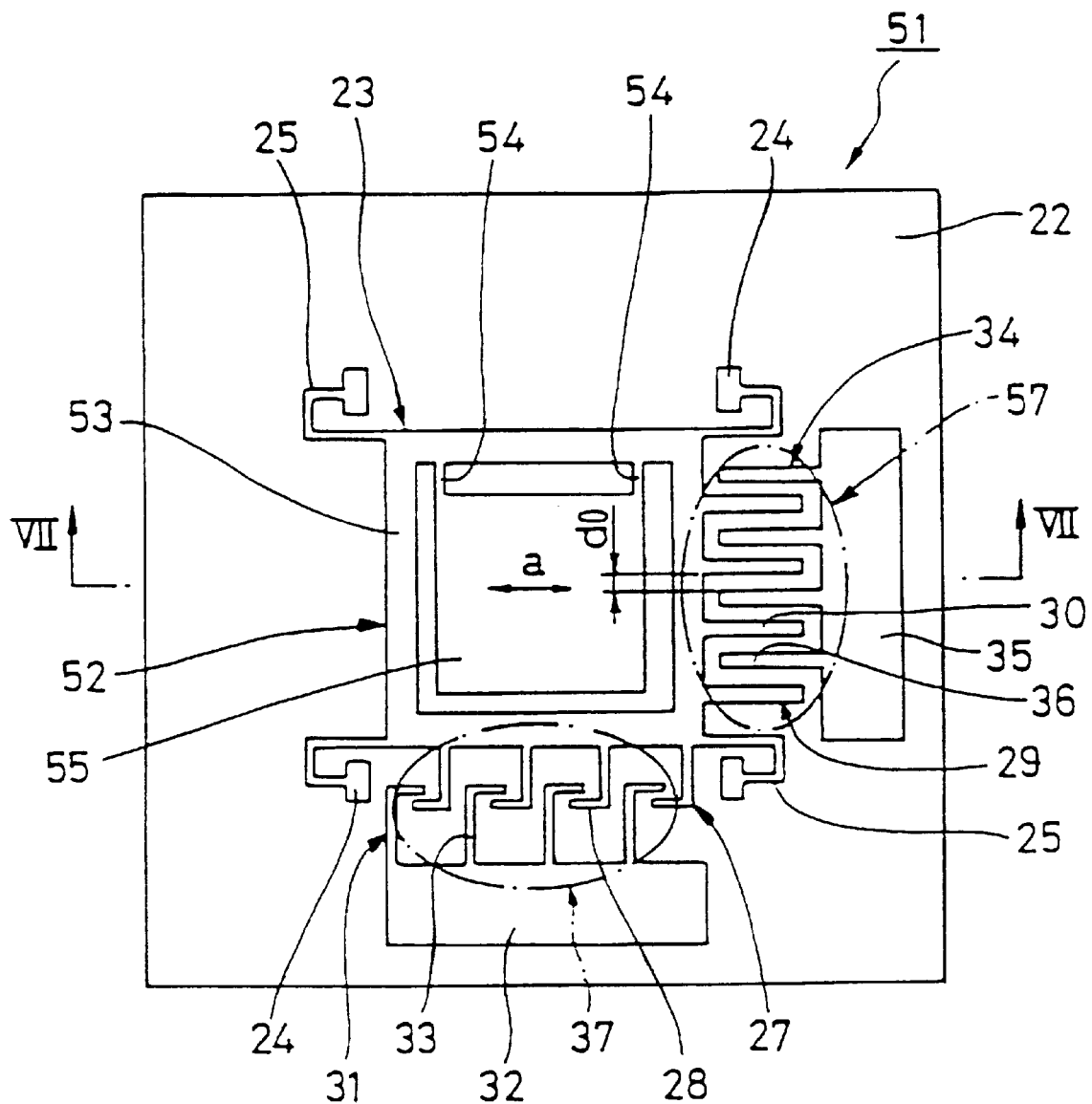
FIG. 6 is a top view of the angular velocity sensor of FIG. 5.
Figure 7:
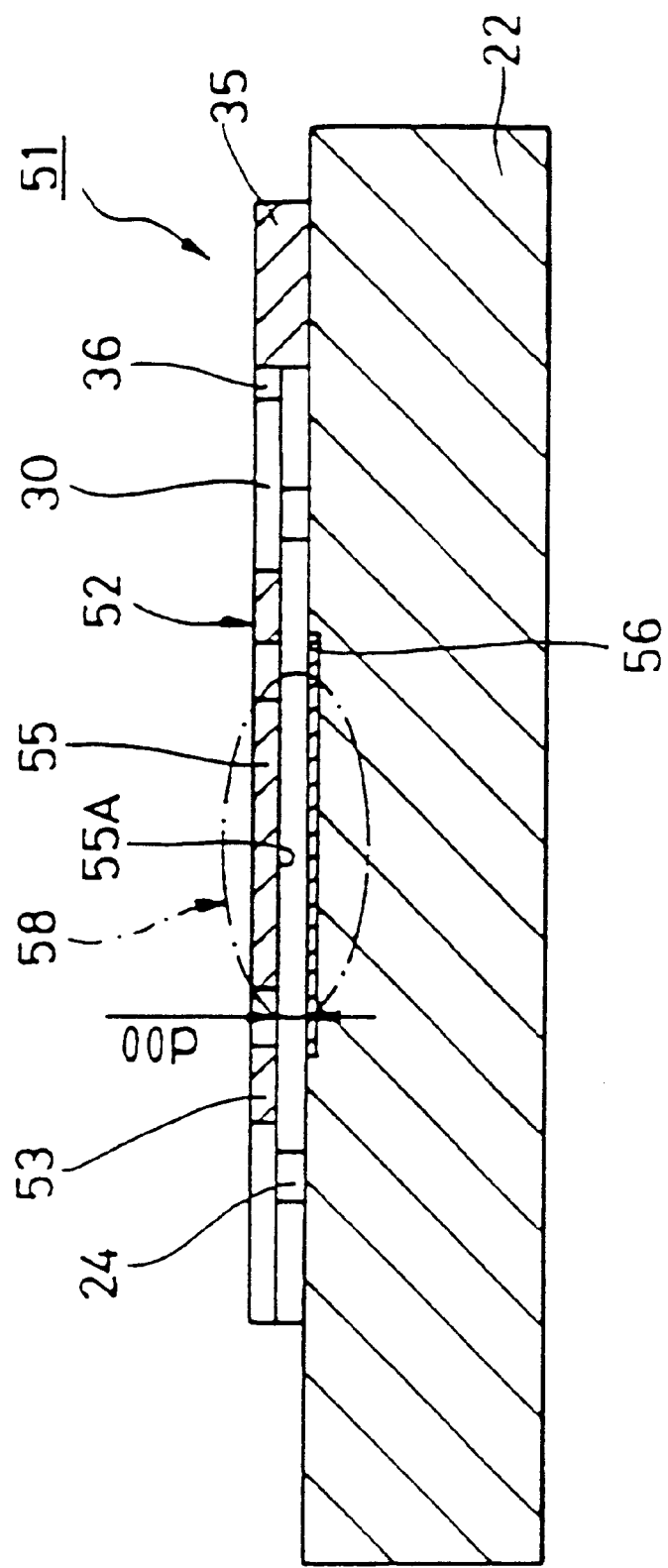
FIG. 7 is a longitudinal sectional view of FIG. 6, taken along line VII—VII.

FIGS. 5 to 7 illustrate a third embodiment of the present invention. In this third embodiment, the vibration plate has a vibration element which can vibrate in the direction perpendicular to the substrate. In this third embodiment, similar or equivalent parts to those of the first embodiment will be denoted by the same reference numerals, and will not be described herein in further detail.

As shown in FIGS. 5 to 7, the angular velocity sensor 51 of the present embodiment has a similar structure to that of the angular velocity sensor 21 according to the first embodiment except that the vibration plate 52 of the movable member 23 is formed in a different shape.

The vibration plate 52 consists of: a rectangular-shaped frame 53 connected to the ends of the respective supporting beams 25; two connection beams 54 which extend, starting from their base ends fixed to the inner wall of one side of the frame 53, toward the center area; and a vibration element 55 connected to the other ends of the connection beams 54. A movable member 23 is formed in an integral fashion with the above vibration plate 52, the supporting beams 25, and fixing parts 24. Since the vibration element 55 is supported only at its one side by the connection beams 54, the vibration element 55 can vibrate in the Z direction perpendicular to the substrate 22. The movable member 23 is made up of polysilicon or single-crystal silicon having a low resistance so that the lower-side electrode 55A of the vibration element 55 can act as the movable electrode.

As shown in FIG. 7, there is provided a substrate electrode 56 formed on the substrate 22 by doping the selected surface area of the substrate 22 with a high density of impurities such as P, Sb, or the like thereby creating an electrically conductive region acting as the electrode.

The angular velocity sensor 51 also has a Y-direction displacement detecting part 57 serving as displacement detecting means for detecting displacement in the Y-direction. As in the displacement detecting part 38 of the first embodiment, the Y-direction displacement detecting part 57 consists of a movable comb-shaped detection electrode 29 and a fixed comb-shaped detection electrode 34. There are gaps do between electrode plates 30 of the movable comb-shaped detection electrode 29 and the adjacent electrode plates 36 of the fixed comb-shaped detection electrode 34. The above movable comb-shaped detection electrode 29 and the fixed comb-shaped detection electrode 34 form a detection parallel-plate capacitor. The capacitance of this parallel-plate detection capacitor changes in response to the change in the gap d0 between the electrode plates 30 and 36.

The vibrating element 55 and the substrate electrode 56 form a Z-direction displacement detecting part 58 serving as displacement detecting means for detecting the displacement in the Z direction. There is a gap d0 between the substrate electrode 56 and the lower-side electrode 55A formed on the lower surface of the vibration element 55 so that a parallel-plate detection capacitor is formed with the lower-side electrode 55A of the vibration element 55 and the substrate electrode 56. The capacitance of this parallel-plate detection capacitor changes in response to the change in the gap d00 between the lower-side electrode 55A of the vibration element 55 and the substrate electrode 56.

In the present embodiment, as described above, the displacement of the vibration plate 52 in the Y direction is detected by the Y-direction displacement detecting part 57, and the displacement of the vibration element 55 in the Z direction is detected by the Z-direction displacement detecting part 58.

The operation of the angular velocity sensor 51 having the above-described structure will be described below.

When a vibration driving signal is applied to the vibration generating part 37, electrostatic attraction occurs between the L-shaped electrode plates 28 and 33, which causes the vibration plate 52 to vibrate in the direction denoted by the arrow a. If the angular velocity sensor 51 is rotated about the Z axis at an angular velocity $\Omega_Z$ while maintaining the above vibration, a Coriolis force acts on the vibration plate 52 and thus the vibration plate 52 is displaced in the Y direction, wherein the Coriolis force is proportional to the angular velocity $\Omega_Z$ and the vibration amplitude of the vibration plate 52. The Y-direction displacement detecting part 57 detects the displacement of the vibration plate 52 in the Y direction by detecting the change in the capacitance corresponding to the change in the gap d0, thereby detecting the angular velocity $\Omega_Z$ about the Z axis. In the case where the angular velocity sensor 51 is rotated about the Z axis, no displacement of the vibration plate 52 in the Z direction occurs.

On the other hand, if an angular velocity $\Omega_y$ about the Y axis is applied to the velocity sensor 51 vibrating in the direction denoted by the arrow a, a Coriolis force acts on the vibration plate 52 and, thus, the vibration plate 52 is displaced in the Z direction. Wherein a Coriolis force is proportional to the angular velocity $\Omega_Y$ and the vibration amplitude of the vibration plate 52. Since the vibration element 55 of the vibration plate 52 is supported by the connection beams 54 so that it can move in the Z direction, the vibration element 55 is displaced in the Z direction by the Coriolis force. The Z-direction displacement detecting part 58 detects the displacement of the vibration element 55 in the Z direction by detecting the change in the capacitance corresponding to the change in the gap d00, thereby detecting the angular velocity $\Omega_y$ about the Y axis.

In the angular velocity sensor 51 of the present embodiment having the vibration plate 52 which can move in both the X and Y directions and also having the vibration element 55 which is formed within the vibration plate 52 in such a manner that the vibration element 55 can move in the Z direction, if an angular velocity $\Omega_z$ about the Z axis is applied when the vibration plate 52 is vibrating in the X direction, then the angular velocity $\Omega_Z$ is detected by the Y-direction displacement detecting part 57 by detecting the displacement of the vibration plate 52 in the Y direction. On the other hand, if an angular velocity $\Omega_Y$ about the Y axis is applied, then the angular velocity $\Omega_Y$ is detected by the Z-direction displacement detecting part 58 by detecting the displacement of the vibration element 55 in the Z direction. Thus, the present embodiment of the invention provides a small-sized angular velocity sensor capable of detecting angular velocities in two different orthogonal directions.

Figure 8:
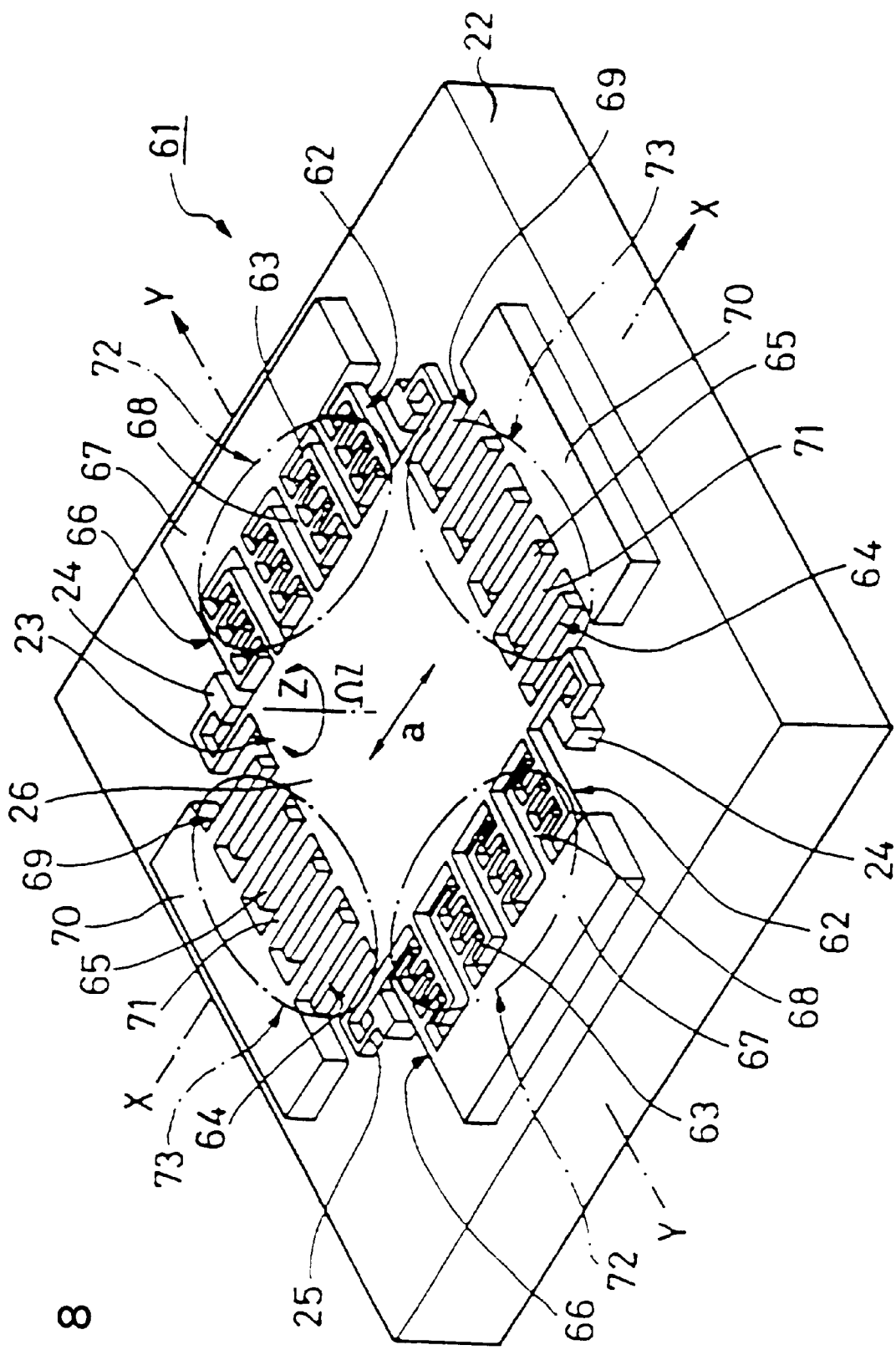
FIG. 8 is a perspective view of a fourth embodiment of an angular velocity sensor according to the invention.
Figure 9:
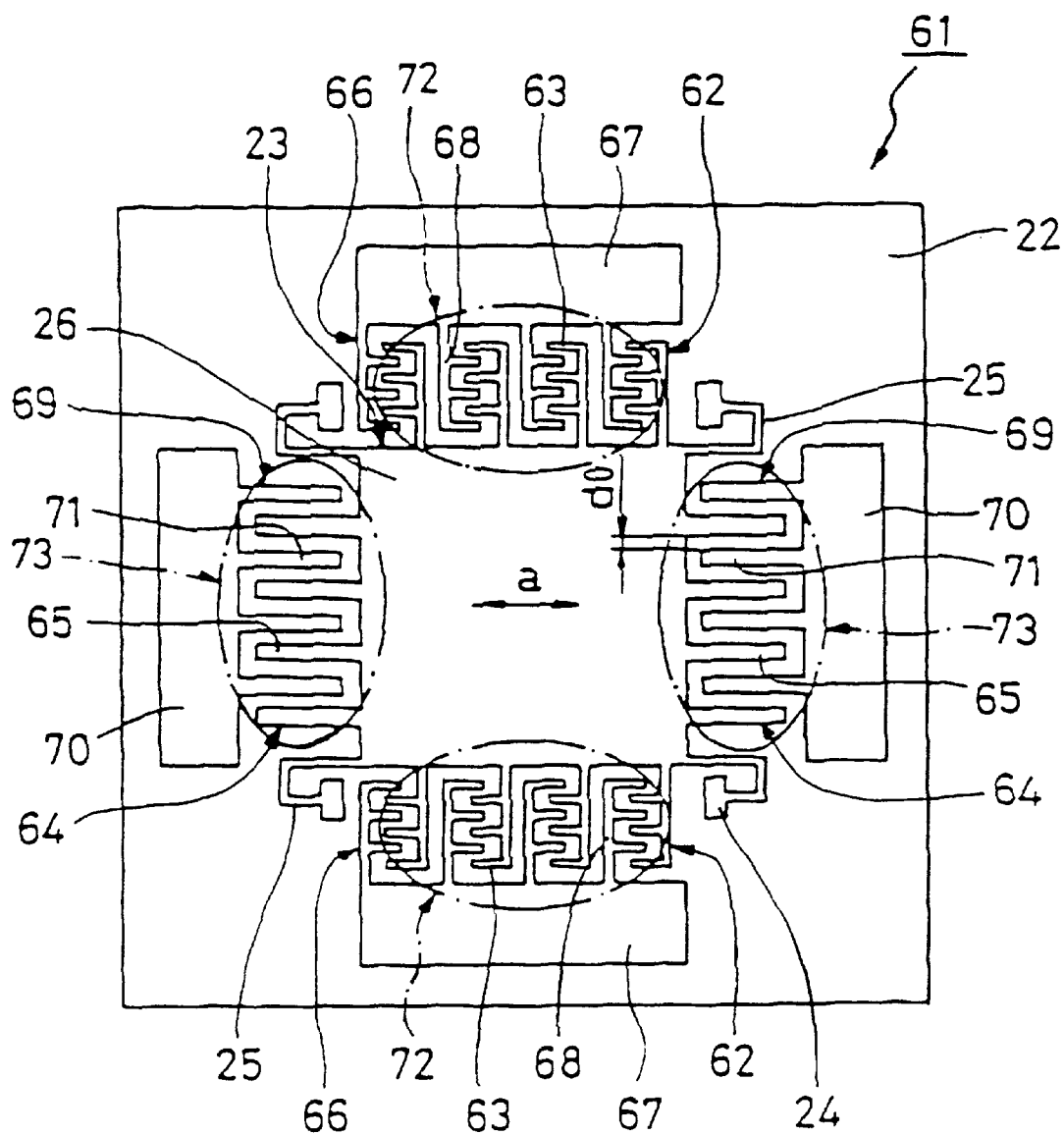
FIG. 9 is a top view of the angular velocity sensor of FIG. 8.
Figure 10:
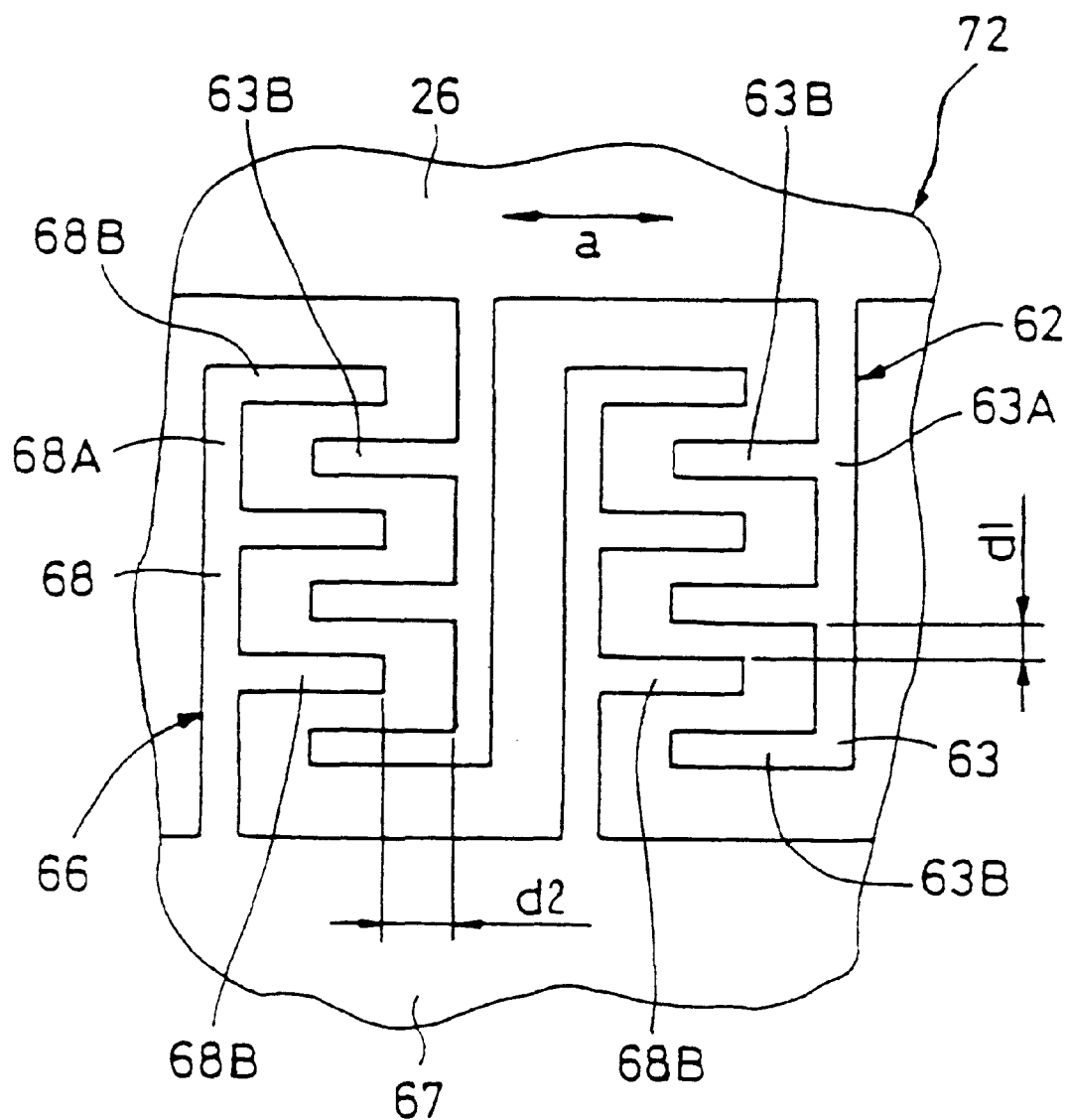
FIG. 10 is an enlarged plan view partially illustrating the angular velocity sensor of FIG. 9.

FIGS. 8 to 10 illustrate a fourth embodiment of the present invention. In this fourth embodiment, vibration generating means is provided at each of two opposite sides of a vibration plate, and vibration detecting means is provided at each of the remaining two opposite sides perpendicular to the sides at which the respective vibration generating means are located. Each vibration generating means is formed with a movable bi-directional vibration-urging electrode and a fixed bi-directional vibration-urging electrode wherein both the movable and fixed bi-directional vibration-urging electrodes have electrode plates formed in the shape of E as a whole consisting of a projecting part and a plurality of bent parts extending from the projecting part. In this fourth embodiment, similar or equivalent parts to those of the first embodiment will be denoted by the same reference numerals, and will not be described herein in further detail.

As shown in FIGS. 8 to 10, the angular velocity sensor 61 of the present embodiment has a similar structure to that of the angular velocity sensor 21 according to the first embodiment except that the electrode plates of the movable bi-directional vibration-urging electrode and the fixed bi-directional vibration-urging electrode are formed into a different shape from that of the first embodiment.

Two movable bi-directional vibration-urging electrodes 62 are formed on the left and right sides of the vibration plate 26, wherein each movable bi-directional vibration-urging electrode 62 includes a plurality of (four) E-shaped electrode plates 63. As shown in FIG. 10, each E-shaped electrode plate 63 includes a projection part 63A projecting in the Y direction and three bent parts 63B extending from the projection part 63A in the X direction such that these three bent parts 63B are parallel to each other.

Two movable comb-shaped detection electrode 64 are formed on the front and rear sides, respectively, of the vibration plate 26 wherein each movable comb-shaped detection electrode includes a plurality of (four) electrode plates 65.

The angular velocity sensor 61 also has two fixed bi-directional vibration-urging electrodes 66 which are formed on the substrate 2 at the left and right sides, respectively, of the vibration plate 26 such that the vibration plate 26 is interposed between these fixed bi-directional vibration-urging electrodes. Each fixed bi-directional vibration-urging electrode 66 includes a fixing part 67 formed on the substrate 22 at a location adjacent to the left or right side of the vibration plate 26, and also a plurality of (four) E-shaped electrode plates 68 projecting from the fixing part 67 wherein these electrode plates 68 extend in parallel to the corresponding E-shaped electrode plates 63 of the movable bi-directional vibration-urging electrode 62. Each E-shaped electrode plate 68 includes a projection part 68A projecting in the Y direction and three bent parts 68B extending from the projection part 68A in the X direction.

The respective E-shaped electrode plates 68 of each fixed bi-directional vibration-urging electrode 66 mesh via a space with the E-shaped electrode plates 63 of corresponding movable bi-directional vibration-urging electrode 62. Each bent part 68B of the fixed bi-directional vibration-urging electrode 66 is spaced by a gap d1 from the adjacent bent part 63B of the movable bi-directional vibration-urging electrode 62. The end of each bent portion 63B is spaced in the X direction by a gap d2 from the adjacent projection part 68A. This gap d2 defines the maximum possible vibration amplitude within which the vibration plate 26 can vibrate in the direction denoted by the arrow a.

Two fixed comb-shaped detection electrode 69 are formed on the front and rear sides, respectively, of the substrate 22. Each fixed comb-shaped detection electrode 69 includes a fixing part 70 formed on the substrate 22 at its front or rear area, and also a plurality of (four) electrode plates 70 projecting from the fixing part 70 wherein these electrode plates 70 extend in parallel to the corresponding electrode plates 65 of the movable comb-shaped detection electrode 64.

Reference numerals 72 and 72 denote vibration generating parts serving as vibration generating means. Each vibration generating part 72 is formed with one movable bi-directional vibration-urging electrode 62 and one fixed bi-directional vibration-urging electrode 66. If a vibration driving signal with a frequency f is applied to the respective vibration generating parts 72, electrostatic attraction occurs between the E-shaped electrode plates 63 and 68, which causes the gap d2 to alternately increase and decrease. Thus the vibration plate 26 vibrates in the direction denoted by the arrow a.

Reference numerals 73 and 73 denote vibration detecting parts serving as vibration detecting means. Each vibration detecting part 73 is formed with one movable comb-shaped detection electrode 64 and one fixed comb-shaped detection electrode 69. There are gaps d0 between electrode plates 65 of each movable comb-shaped detection electrode 64 and the adjacent electrode plates 71 of the corresponding fixed comb-shaped detection electrode 69. Each movable comb-shaped detection electrode 64 and the corresponding fixed comb-shaped detection electrode 69 form a detection parallel-plate capacitor. The capacitance of this parallel-plate detection capacitor changes in response to the change in the gap d0 between the electrode plates 65 and 71.

The angular velocity sensor 61 having the above-described structure according to the present embodiment operates in a similar manner to the angular velocity sensor 21 according to the first embodiment described earlier, and thus the operation is not described herein in further detail.

In the present embodiment, as described above, the E-shaped electrode plates 63 and 68 constituting the vibration generating part 72 are each formed with the plurality of bent parts 63B and 68B, respectively. This structure ensures that the movable bi-directional vibration-urging electrode 62 and the fixed bi-directional vibration-urging electrode 66 have a large effective area. This allows the vibration plate 26 to vibrate with a large amplitude in the direction denoted by the arrow a in response to a vibration driving signal applied to the vibration generating parts 72 even if the vibration driving signal has a small amplitude. As a result, high detection sensitivity can be achieved.

Figure 11:
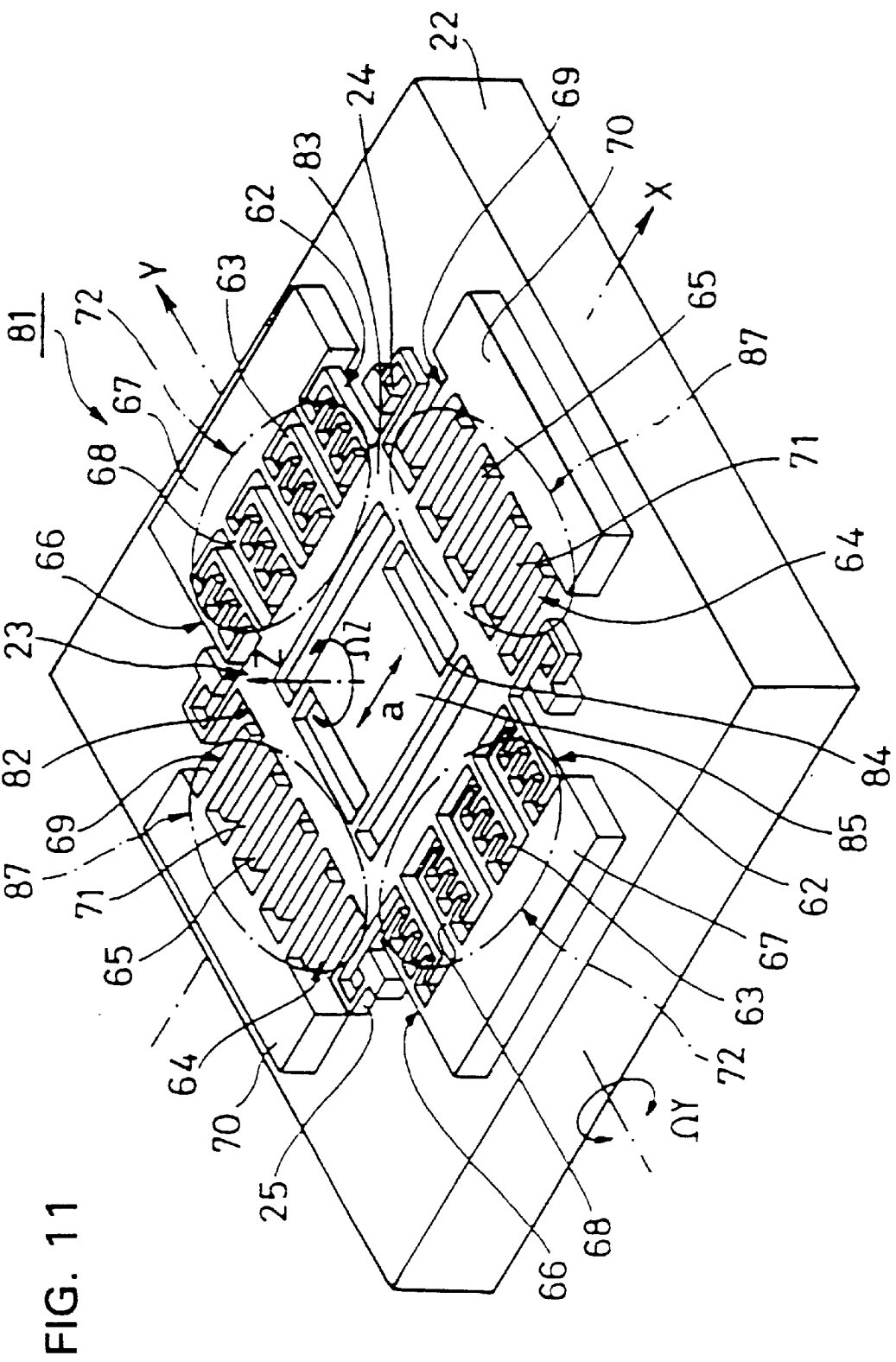
FIG. 11 is a perspective view of a fifth embodiment of an angular velocity sensor according to the invention.
Figure 12:
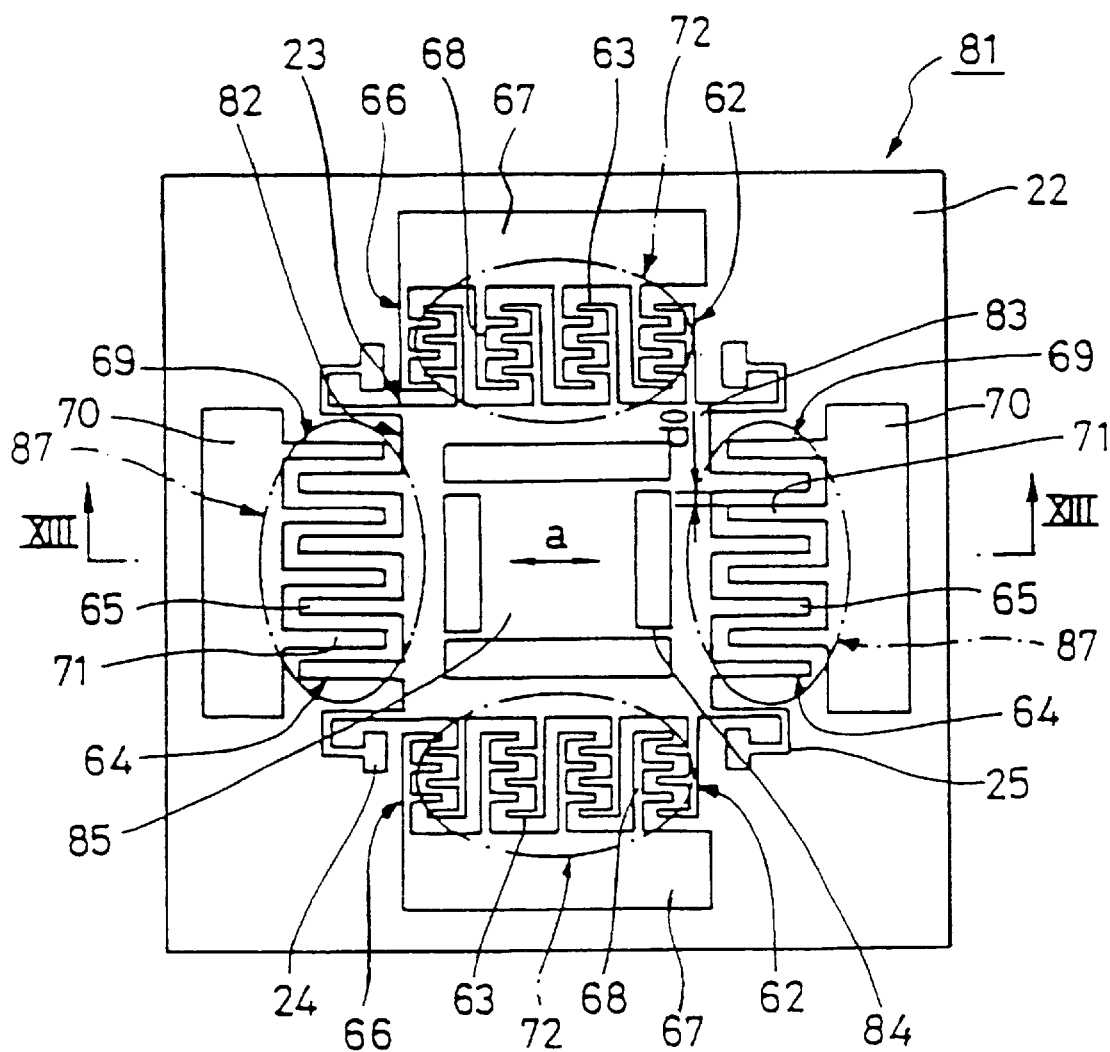
FIG. 12 is a top view of the angular velocity sensor of FIG. 11.
Figure 13:
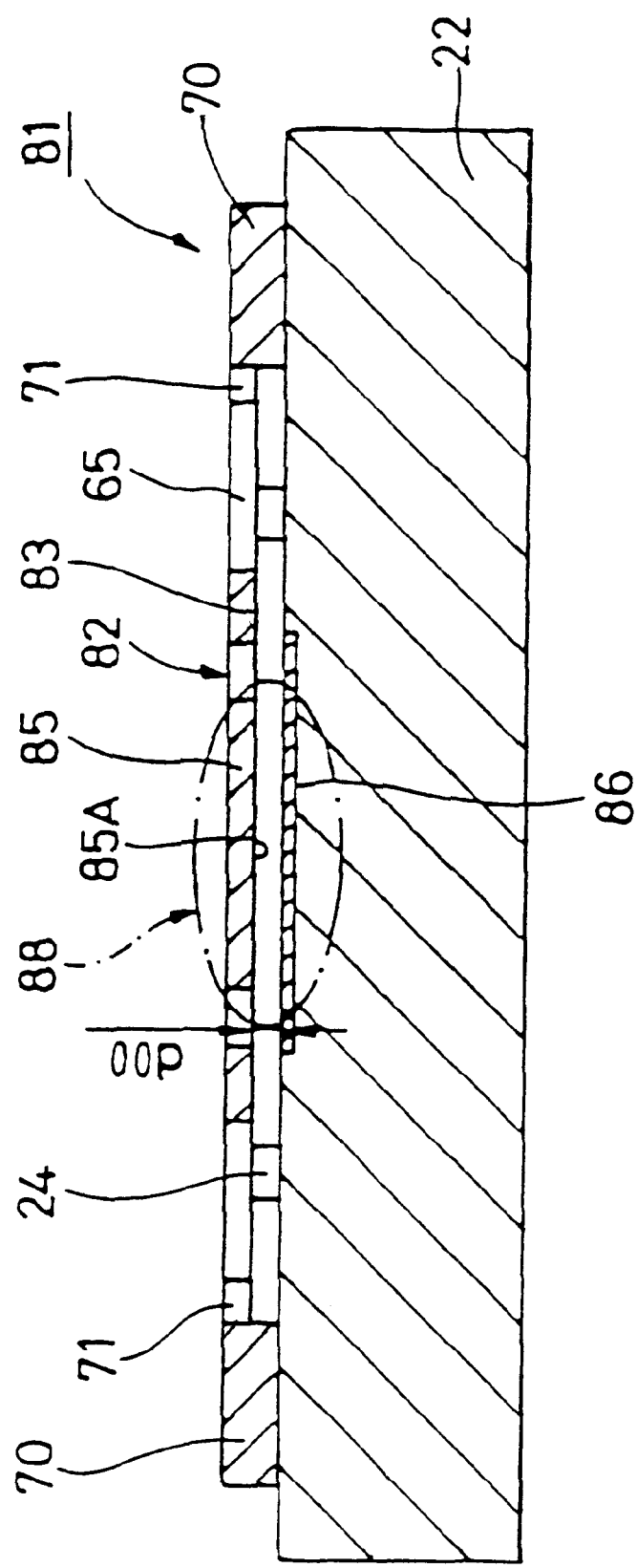
FIG. 13 is a longitudinal sectional view of FIG. 12, taken along line XIII—XIII.

FIGS. 11 to 13 illustrate a fifth embodiment of the present invention. In this fifth embodiment, the vibration plate 26 of the angular velocity sensor 61 of the fourth embodiment is replaced by a vibration plate having a vibration element which can move in the Z direction such as that employed in the third embodiment. In this fifth embodiment, similar or equivalent parts to those of the fourth embodiment will be denoted by the same reference numerals, and will not be described herein in further detail.

As shown in FIGS. 11 to 13, the angular velocity sensor 81 of the present embodiment has a similar structure to that of the angular velocity sensor 61 according to the fourth embodiment except that the vibration plate 82 of the movable member 23 is formed into a different shape from that of the fourth embodiment.

The vibration plate 82 includes: a rectangular-shaped frame 83 connected to the ends of respective supporting beams 25; four connection beams 84 which extend, starting from their own base ends fixed to the inner wall of the frame 83, toward the center area; and an vibration element 85 connected to the other ends of the respective connection beams 84. A movable member 23 is formed in an integral fashion with the above vibration plate 82, the supporting beams 25, and fixing parts 24. The vibration element 85 is supported by the connection beams 84 so that the vibration element 85 can vibrate in the Z direction perpendicular to the substrate 22. There is provided a lower-side electrode 85A on the lower surface of the vibration element 85 so that it acts as a movable electrode.

As shown in FIG. 13, there is provided a fixed electrode or a substrate electrode 86 formed on the substrate 22 by doping the selected surface area of the substrate 22 with a high density of impurities such as P, Sb, or the like thereby creating an electrically conductive region acting as the electrode.

The angular velocity sensor 81 also has Y-direction displacement detecting parts 87 serving as displacement detecting means for detecting displacement in one direction. Each Y-direction displacement detecting part 57 is formed with one movable comb-shaped detection electrode 64 and one fixed comb-shaped detection electrode 69. There are gaps do between the electrode plates 65 of each movable comb-shaped detection electrode 64 and the adjacent electrode plates 71 of the corresponding fixed comb-shaped detection electrode 69. Each movable comb-shaped detection electrode 64 and the corresponding fixed comb-shaped detection electrode 69 form a detection parallel-plate capacitor. The capacitance of this parallel-plate detection capacitor changes in response to the change in the gap d0 between the electrode plates 65 and 71.

The vibrating element 85 and the substrate electrode 86 form a Z-direction displacement detecting part 88 serving as displacement detecting means for detecting displacement in another direction. There is a gap d00 between the substrate electrode 86 and the lower-side electrode 85A formed on the lower surface of the vibration element 85 so that a parallel-plate detection capacitor is formed with the lower-side electrode 85A of the vibration element 85 and the substrate electrode 86. The capacitance of this parallel-plate detection capacitor changes in response to the change in the gap d00 between the lower-side electrode 85A of the vibration element 85 and the substrate electrode 86.

The angular velocity sensor 81 having the above-described structure operates in a similar manner to the angular velocity sensor 51 according to the third embodiment described above, and thus can detect angular velocities about two axes, that is the angular velocity $\Omega_Z$ about the Z axis and the angular velocity $\Omega_Y$ about the Y axis.

Furthermore, since the E-shaped electrode plates 63 and 68 constituting the vibration generating parts 72 are formed in such a manner to have large effective areas, the vibration plate 82 can vibrate with a large amplitude in the direction denoted by the arrow a. This allows the vibration plate 82 or the vibration element 85 to be greatly displaced by the Coriolis force. As a result, large changes occur in the capacitances detected by the Y-direction displacement detecting parts 87 and the Z-direction displacement detecting part 88. Thus, a high detection sensitivity can be achieved.

Figure 14:
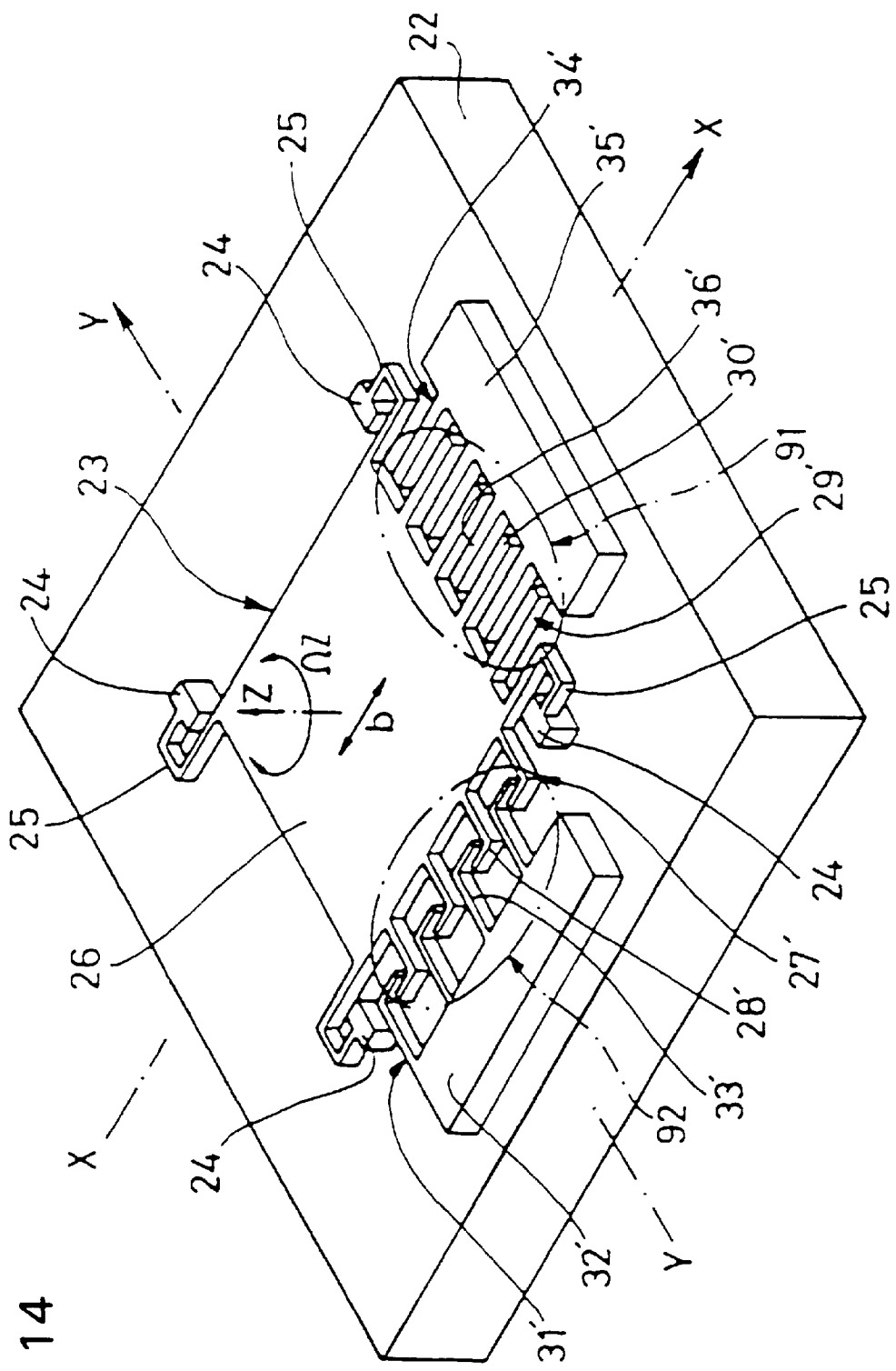
FIG. 14 is a perspective view of a sixth embodiment of an angular velocity sensor according to the invention.

FIG. 14 illustrates a sixth embodiment of the present invention. In this sixth embodiment, the bi-directional electrode used in the vibration generating part 37 in the first embodiment is employed herein to form displacement detecting means, while the comb-shaped electrode used in the displacement detecting part 38 in the first embodiment is employed herein to form vibration generating means.

In this sixth embodiment, similar or equivalent parts to those of the first embodiment will be denoted by the same reference numerals, and will not be described herein in further detail. However, since the vibration generating part 37 and the displacement detecting part 38 of the first embodiment are replaced in their roles by each other in the present embodiment, the movable bi-directional vibration-urging electrode 27 and the fixed bi-directional vibration-urging electrode 31 forming the vibration generating part 37 in the first embodiment are denoted herein by reference numerals with a prime as the movable bi-directional detection electrode 27' and the fixed bi-directional detection electrode 31'. Similarly, the movable comb-shaped detection electrode 29 and the fixed comb-shaped detection electrode 34 forming the displacement detecting part 38 are denoted herein by reference numerals with a prime as the movable comb-shaped vibration-urging electrode 29' and the fixed comb-shaped vibration-urging electrode 34'.

In FIG. 14, reference numeral 91 denotes the vibration generating part serving as vibration generating means formed with the movable comb-shaped vibration-urging electrode 29' and the fixed comb-shaped vibration-urging electrode 34'. If a vibration driving signal with a frequency f is applied to the vibration generating part 91, electrostatic attraction occurs between the electrode plates 30' and 36', which causes the vibration plate 26 to vibrate in the direction denoted by the arrow b.

Reference numeral 92 denotes the displacement detecting part serving as displacement detecting means formed with the movable bi-directional detection electrode 27' and the fixed bi-directional detection electrode 31'. A detection capacitor is formed between the L-shaped electrode plates 28' of the movable bi-directional detection electrode 27' and the L-shaped electrode plates 33' of the fixed bi-directional detection electrode 31'. The displacement detecting part 92 detects the change in the capacitance of the detection capacitor thereby detecting the change in the gap between the L-shaped electrode plates 28' and 33'.

The angular velocity sensor of the present embodiment also operates in a similar manner to that of the first embodiment. That is, if a vibration driving signal is applied to the vibration generating part 91, electrostatic attraction occurs between the electrode plates 30' and 36', which causes the vibration plate 26 to vibrate in the direction denoted by the arrow b. If an angular velocity $\Omega_Z$ about the Z axis is applied when the vibration plate 26 is vibrating in the direction b, a Coriolis force in the Y direction acts on the vibration plate 26 which is adapted to move in the Y direction, wherein the Coriolis force is proportional to the angular velocity $\Omega_Z$ and the vibration amplitude of the vibration plate 26.

The above Coriolis force causes the vibration plate 26 to vibrate in the Y direction. In response to the displacement of the vibration plate 26, the distances between the respective L-shaped electrode plates 33' of the fixed bi-directional detection electrode 31' and the corresponding L-shaped electrode plates 28' of the movable bi-directional detection electrode 27' alternately increase and decrease. Thus, the displacement detecting part 92 can detect the angular velocity $\Omega_Z$ about the Z axis by detecting the change in the distance between the L-shaped electrode plates 28' and 33' as the change in the capacitance.

Although in this sixth embodiment the vibration plate of the angular velocity sensor is adapted to move horizontally in the X or Y direction, the technique may also be applied to an angular velocity sensor having a vibration plate which can also move in the vertical direction as in the embodiment shown in FIG. 5.

Figure 15:
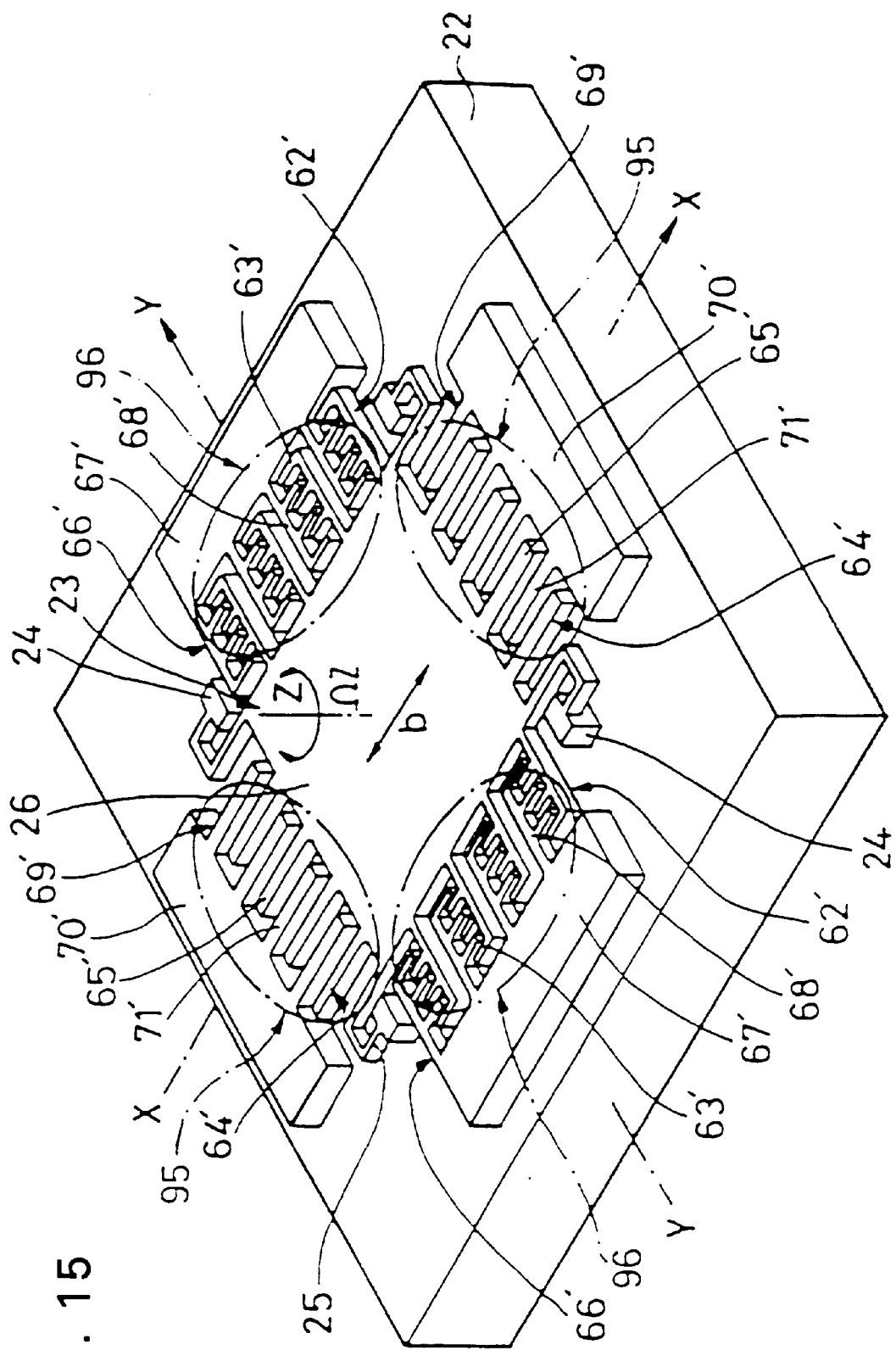
FIG. 15 is a perspective view of a seventh embodiment of an angular velocity sensor according to the invention.
Figure 16:
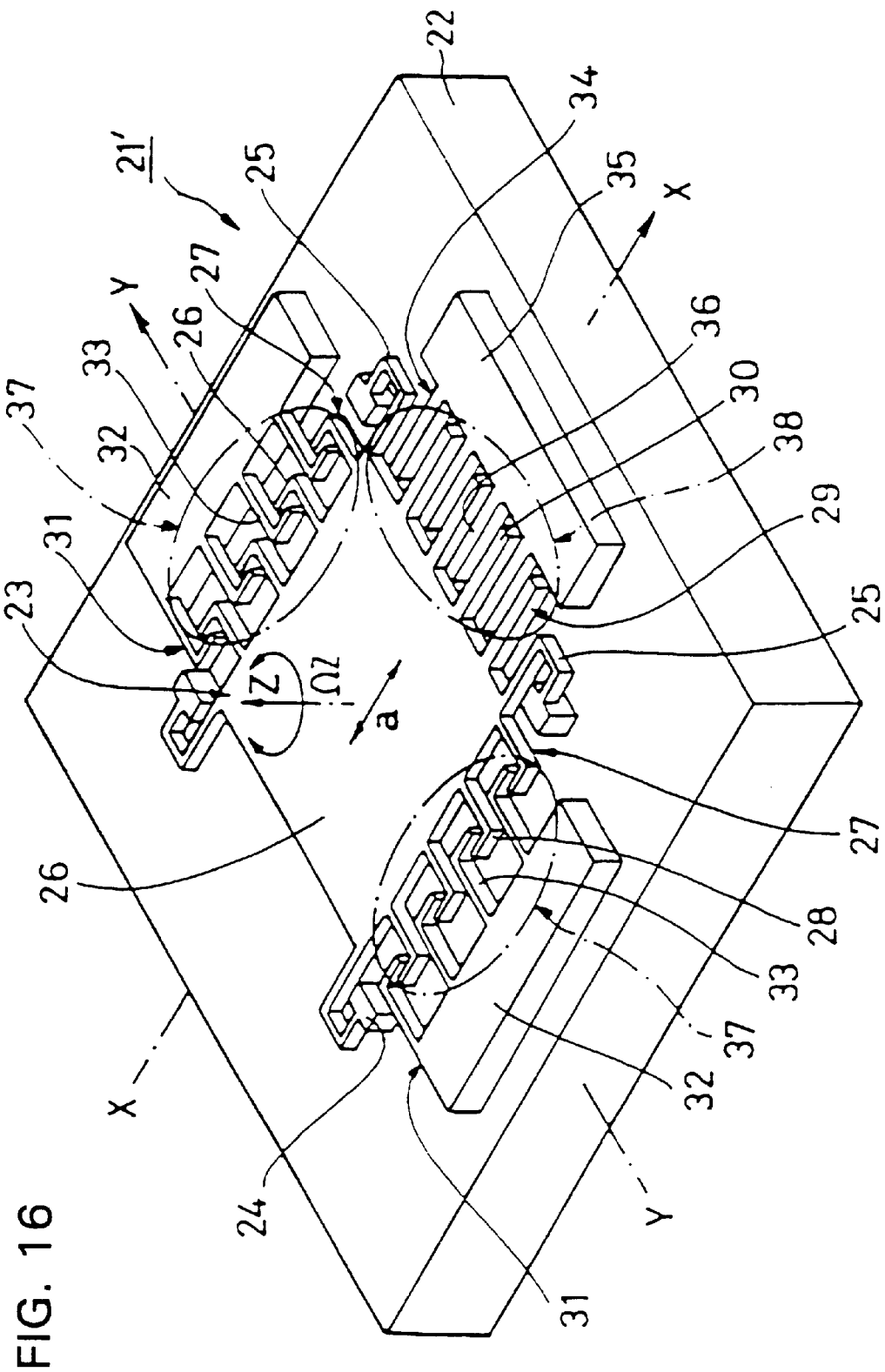
FIG. 16 is a perspective view illustrating a modification of the first embodiment of the angular velocity sensor.
Figure 17:
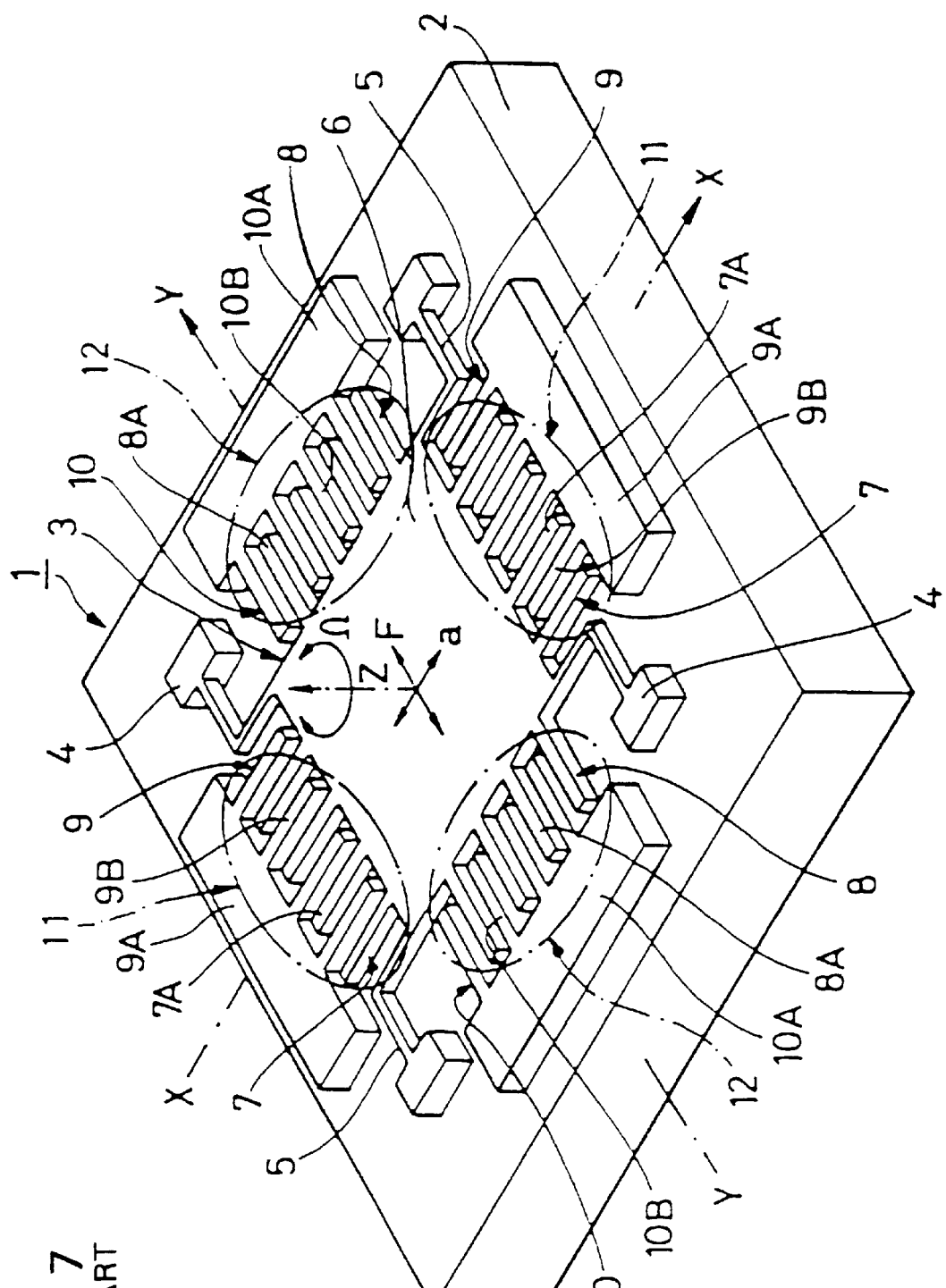
FIG. 17 is a perspective view of a conventional angular velocity sensor.

FIG. 15 illustrates a seventh embodiment of the present invention. In this seventh embodiment, the bi-directional electrodes used in the vibration generating part 72 in the fourth embodiment are employed herein to form displacement detecting means, while the comb-shaped electrodes used in the displacement detecting part 73 in the fourth embodiment are employed herein to form vibration generating means.

In this seventh embodiment, similar or equivalent parts to those of the fourth embodiment will be denoted by the same reference numerals, and will not be described herein in further detail. However, since the vibration generating parts 72 and the displacement detecting parts 73 of the fourth embodiment are replaced in their roles by each other in the present embodiment, the movable bi-directional vibration-urging electrodes 62 and the fixed bi-directional vibration-urging electrodes 66 forming the vibration generating parts 72 in the fourth embodiment are denoted herein by reference numerals with a prime as the movable bi-directional detection electrodes 62' and the fixed bi-directional detection electrodes 66'. Similarly, the movable comb-shaped detection electrodes 64 and the fixed comb-shaped detection electrodes 69 forming the displacement detecting parts 73 are denoted herein by reference numerals with a prime as the movable comb-shaped vibration-urging electrodes 64' and the fixed comb-shaped vibration-urging electrodes 69'.

In FIG. 15, reference numeral 95 denotes the vibration generating part serving as vibration generating means formed with the movable comb-shaped vibration-urging electrode 64' and the fixed comb-shaped vibration-urging electrode 69'. If a vibration driving signal with a frequency f is applied to the vibration generating part 95, electrostatic attraction occurs between the electrode plates 65' and 71', which causes the vibration plate 26 to vibrate in the direction denoted by the arrow b.

Reference numeral 96 denotes the displacement detecting part serving as displacement detecting means formed with the movable bi-directional detection electrode 62' and the fixed bi-directional detection electrode 66'. A detection capacitor is formed between the E-shaped electrode plates 63' of the movable bi-directional detection electrode 62' and the E-shaped electrode plates 68' of the fixed bi-directional detection electrode 66'. The displacement detecting part 92 detects the change in the capacitance of the detection capacitor thereby detecting the change in the gap between the E-shaped electrode plates 66' and 68'.

The angular velocity sensor having the above structure according to the present embodiment operates in a similar manner to that of the fourth embodiment, and thus can detect the angular velocity $\Omega_Z$ about the Z axis.

Although in this seventh embodiment the vibration plate 26 of the angular velocity sensor is adapted to move horizontally in the X or Y direction, the technique may also be applied to an angular velocity sensor having a vibration plate which can also move in the vertical direction as in the embodiment shown in FIG. 11.

In the specific embodiments described above, the vibration generating part is disposed on one side of the vibration plate and the displacement detecting part is disposed on another side perpendicular to the above side, as in the angular velocity sensor 21 or 51, or, instead, two vibration generating parts are disposed on two opposite sides of the vibration plate and two displacement detecting parts are disposed on the remaining two opposite sides perpendicular to the former two sides, as in the angular velocity sensor 61 or 81. However, the present invention is not limited to such the structures. For example, as in the angular velocity sensor 21' shown in FIG. 16, two vibration generating parts 37 may also be disposed at the left and right sides of the vibration plate 26. Alternatively, a vibration generating part may also be disposed at the left side of the vibration plate, and two displacement detecting parts may be disposed at the front and rear sides.

In the second embodiment, the servo mechanism 41 is coupled with the angular velocity sensor 21 according to the first embodiment. The servo mechanism may also be coupled with other types of angular velocity sensors 51, 61, 81, and 21'.

Furthermore, in the third embodiment described above, the displacement detecting means is formed with the Y-direction displacement detecting part 57 and the Z-direction displacement detecting part 58. In the fifth embodiment, on the other hand, the displacement detecting means is formed with the Y-direction displacement detecting part 87 and the Z-direction displacement detecting part 88. However, the present invention is not limited to such a structure. For example, in the third embodiment, the displacement detecting means may also be formed only with the Z-direction displacement detecting part 57. Similarly, the displacement detecting means in the fifth embodiment may also be formed only with the Z-direction displacement detecting part 88.

As described above, the present invention has various features and advantages. In the first aspect of the invention, when a vibration driving signal is applied between the movable bi-directional electrode and the fixed bi-directional electrode of the vibration generating means, electrostatic force occurs between the facing X-extending and Y-extending parts of the movable and fixed bi-directional electrodes. The electrostatic force causes the movable bi-directional electrode to move alternately close to and apart from the fixed bi-directional electrode. As a result, the vibration plate vibrates either in the X direction or in the Y direction. On the other hand, since the displacement detecting means is provided for detecting the displacement of the vibration plate by detecting the change in the capacitance between the movable comb-shaped electrode formed on the vibration plate and the fixed comb-shaped electrode, if an angular velocity about the Z axis is applied to the vibration plate when the vibration plate is being vibrated for example in the X direction, then the vibration plate is displaced in the Y direction in response to the angular velocity and this displacement is detected by the displacement detecting means. Thus, the angular velocity about the Z axis can be detected. Furthermore, since the movable comb-shaped electrode and the fixed comb-shaped electrode in the displacement detecting means each have parts extending in the same direction as that in which the vibration plate is vibrated by the vibration generating means, the vibration amplitude of the vibration plate is not limited by the comb-shaped electrodes forming the displacement detecting means. As a result, the angular velocity about the Z axis can be detected with higher sensitivity.

In the second aspect of the present invention, when a vibration driving signal is applied between the movable comb-shaped electrode and the fixed comb-shaped electrode of the vibration generating means, electrostatic force occurs between the facing X-extending and Y-extending parts of the movable and fixed comb-shaped electrodes. The electrostatic force causes the movable comb-shaped electrode to move alternately close to and apart from the fixed comb-shaped electrode. As a result, the vibration plate vibrates either in the X direction or in the Y direction. On the other hand, since the displacement detecting means is provided for detecting the displacement of the vibration plate by detecting the change in the capacitance between the movable bi-directional electrode formed on the vibration plate and the fixed bi-directional electrode, if an angular velocity about the Z axis is applied to the vibration plate when the vibration plate is being vibrated for example in the X direction, then the vibration plate is displaced in the Y direction in response to the angular velocity and this displacement is detected by the displacement detecting means. Thus, the angular velocity about the Z axis can be detected. Furthermore, since the movable bi-directional electrode and the fixed bi-directional electrode in the displacement detecting means each have parts extending in the same direction as that in which the vibration plate is vibrated by the vibration generating means, the vibration amplitude of the vibration plate is not limited by the bi-directional electrodes forming the displacement detecting means. As a result, the angular velocity about the Z axis can be detected with higher sensitivity.

In the third aspect of the present invention, the vibration plate includes an outer frame and a vibration element which is disposed inside the outer frame via a connection beam in such a manner that the vibration element can move in the Z direction, and there is further provided a Z-direction displacement detecting means formed with a movable electrode formed on the vibration element and a fixed electrode formed on the substrate such that the fixed electrode and the movable electrode face each other via a space. With this arrangement, if an angular velocity about the Y axis is applied to the vibration plate which is being vibrated for example in the X direction by the vibrating generating means, then the vibration element is displaced in the Z direction in response to the angular velocity. The Z-direction displacement detecting means detects the above displacement by detecting the change in capacitance corresponding to the gap between the movable electrode formed on the vibration element and the fixed electrode formed on the substrate.

In the fourth aspect of the present invention, the movable bi-directional electrode and the fixed bi-directional electrode each include a plurality of electrode plates each including a part extending in the X direction and a part extending in the Y direction, wherein the plurality of electrode plates of the movable bi-directional electrode face via a space the plurality of electrode plates of the fixed bi-directional electrode. In the case where the movable bi-directional electrode and the fixed bi-directional electrode are used as the vibration generating means, if a vibration driving signal is applied between these electrodes, then electrostatic force occurs between the electrodes and thus the vibration plate vibrates in the X direction with a large amplitude. In the case where the movable bi-directional electrode and the fixed bi-directional electrode are used as the displacement detecting means, a great change occurs in the gap between the electrodes, which results in a large change in the capacitance detected by the displacement detecting means.

In the fifth aspect of the present invention, the electrode plates of the movable bi-directional electrode and the electrode plates of the fixed bi-directional electrode are disposed such that these electrode plates mesh each other via spaces. In the case where the movable bi-directional electrode and the fixed bi-directional electrode are used as the vibration generating means, if a vibration driving signal is applied between the movable bi-directional electrode and the fixed bi-directional electrode, electrostatic force is generated between the projection parts of the electrode plates of the movable bi-directional electrode and the adjacent projection parts of the electrode plates of the fixed bi-directional electrode and also between the bent parts of the electrode plates of the movable bi-directional electrode and the bent parts of the electrode plates of the fixed bi-directional electrode. The electrostatic force causes the movable bi-directional electrode to move with respect to the fixed bi-directional electrode in the same direction as that in which the bent parts extend, and thus the vibration plate vibrates in the X direction with a large amplitude. In the case where the movable bi-directional electrode and the fixed bi-directional electrode are used as the displacement detecting means, a great change occurs in the gap between the opposing bent parts of the electrode plates of the movable and fixed bi-directional electrodes, which results in a large change in the capacitance detected by the displacement detecting means.

In the sixth aspect of the present invention, there are provided two vibration generating means of the type described above, located separately on two parallel sides of the vibration plate. This arrangement allows the movable bi-directional electrode formed on the vibration plate and the fixed bi-directional electrode formed on the substrate to have a larger effective area. This allows the vibration generating means to drive the vibration plate with a larger amplitude in the X direction.

In the seventh aspect of the present, there are provided two displacement detecting means of the type described above, located separately on the other two parallel sides of the vibration plate, wherein the other two parallel sides are orthogonal to the sides on which the vibration generating means are disposed. This arrangement allows the movable comb-shaped electrode formed on the vibration plate and the fixed comb-shaped electrode formed on the substrate to have a larger effective area. This leads to an increase in the capacitance detected by the displacement detecting means.

In the eighth aspect of the present invention, the angular velocity sensor further includes: capacitance detecting means for detecting the displacement caused by the angular velocity by detecting a change in capacitance; and control means for supplying a control signal to the displacement detecting means, the control signal having a value which makes the displacement zero, the value being determined on the basis of the change in capacitance detected by the capacitance detecting means, wherein the capacitance detecting means and the control means are disposed at a stage following the displacement detecting means, whereby the displacement caused by the angular velocity is determined from the control signal output by the control means.

The capacitance detecting means and the control means form a servo mechanism which operates to prevent the displacement due to the angular velocity. When the vibration plate is going to be displaced, the control means supplies a control signal to the displacement detecting means so that the electrostatic force is produced by the applied control signal thereby cancelling the displacement. In this operation, the control signal corresponds to the magnitude of the angular velocity. This allows high-accuracy detection of angular velocity regardless of the gap between electrode plates of the displacement detecting means.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. An angular velocity sensor comprising:
    a substrate;
    a supporting beam whose base end is fixed to said substrate;
    a vibration plate which is connected to the other end of said supporting beam and is spaced from the surface of said substrate so that said vibration plate can move in X and Y directions;
    vibration generating means for vibrating said vibration plate either in the X direction or in the Y direction; and
    displacement detecting means for detecting a displacement which occurs either in the X direction or in the Y direction different from said direction in which said vibration plate is vibrated in response to the change in angular velocity applied to said vibration plate being vibrated in either said X or Y direction by said vibration generating means, at least one of said vibration generating means and said displacement detecting means comprising: a movable bi-directional electrode including a part extending in the X direction and a part extending in the Y direction, said movable bi-directional electrode being formed on at least one side of said vibration plate in such a manner that it projects from said at least one side of said vibration plate; and a fixed bi-directional electrode including a part extending in the X direction and a part extending in the Y direction, said fixed bi-directional electrode being formed on said substrate in such a manner that said fixed bi-directional electrode faces in spaced relationship said movable bi-directional electrode.

2. An angular velocity sensor according to claim 1, wherein the movable bi-directional and fixed bi-directional electrodes are part of the vibration generating means.

3. An angular velocity sensor according to claim 2, wherein said displacement detecting means comprises: a movable comb-shaped electrode formed on at least one of the remaining sides, orthogonal to said at least one side on which said movable bi-directional electrode is formed, said movable comb-shaped electrode projecting from said at least one side of said vibration plate; and a fixed comb-shaped electrode formed on said substrate in such a manner that said fixed comb-shaped electrode faces in spaced relationship said movable comb-shaped electrode.

4. An angular velocity sensor according to claim 1, wherein the movable bi-directional and fixed bi-directional electrodes are part of the displacement detection means.

5. An angular velocity sensor according to claim 4, wherein said vibration generating means comprises: a movable comb-shaped electrode formed on at least one of the remaining sides, orthogonal to said at least one side on which said movable bi-directional electrode is formed, said movable comb-shaped electrode projecting from said at least one side of said vibration plate; and a fixed comb-shaped electrode formed on said substrate in such a manner that said fixed comb-shaped electrode faces in spaced relationship said movable comb-shaped electrode.

6. An angular velocity sensor according to claims 1, 3, 4 or 5, wherein: said vibration plate comprises an outer frame and a vibration element which is disposed inside said outer frame via a connection beam in such a manner that said vibration element can move in the Z direction; and said angular velocity sensor further comprises a Z-direction displacement detecting means formed with a movable electrode formed on said vibration element and a fixed electrode formed on said substrate such that said fixed electrode and said movable electrode face each other in spaced relationship, whereby said Z-direction displacement detecting means detects a displacement of said vibration element in the Z direction corresponding to a change in angular velocity applied to said vibration plate which is vibrated either in the X direction or in the Y direction by said vibration generating means.

7. An angular velocity sensor according to claim 6, wherein said movable bi-directional electrode and said fixed bi-directional electrode each comprise a plurality of electrode plates each including a part extending in the X direction and a part extending in the Y direction, said plurality of electrode plates of said movable bi-directional electrode facing in spaced relationship said plurality of electrode plates of said fixed bi-directional electrode.

8. An angular velocity sensor according to claim 7, wherein said plurality of electrode plates of said movable bi-directional electrode and said plurality of electrode plates of said fixed bi-directional electrode each includes: a projection part serving as said part extending in the Y direction and projecting from said vibration plate; and a bent part serving as said part extending in the X direction and being bent at the end of said projection part.

9. An angular velocity sensor according to claim 8 wherein there are provided two said vibration generating means located separately on two parallel sides of said vibration plate.

10. An angular velocity sensor according to claim 9 wherein there are provided two said displacement detecting means located separately on the other two parallel sides of said vibration plate, said other two parallel sides being orthogonal to said sides on which said vibration generating means are disposed.

11. An angular velocity sensor according to claim 10, further comprising capacitance detecting means for detecting the displacement caused by the angular velocity by detecting a change in capacitance; and control means for supplying a control signal to said displacement detecting means, said control signal having a value which makes said displacement zero, said value being determined on the basis of the change in capacitance detected by said capacitance detecting means, wherein said capacitance detecting means and said control means are disposed at a stage following said displacement detecting means, whereby said displacement caused by the angular velocity is determined from the control signal output by said control means.

12. An angular velocity sensor comprising:

a substrate;

a supporting beam whose base end is fixed to said substrate;

a vibration plate which is connected to the other end of said supporting beam and is spaced from the surface of said substrate so that said vibration plate can move in X and Y directions;

a vibration generating part for vibrating said vibration plate either in the X direction or in the Y direction; and a displacement detecting part for detecting a displacement which occurs either in the X direction or in the Y direction different from said direction in which said vibration plate is vibrated in response to the change in angular velocity applied to said vibration plate being vibrated in either said X or Y direction by said vibration generating part, at least one of said vibration generating part and said displacement detecting part comprising: a movable bi-directional electrode including an element extending in the X direction and an element extending in the Y direction, said movable bi-directional electrode being formed on at least one side of said vibration plate in such a manner that it projects from said at least one side of said vibration plate; and a fixed bi-directional electrode including an element extending in the X direction and an element extending in the Y direction, said fixed bi-directional electrode being formed on said substrate in such a manner that said fixed bi-directional electrode faces in spaced relationship said movable bi-directional electrode.

13. An angular velocity sensor according to claim 12, wherein the movable bi-directional and fixed bi-directional electrodes are part of the vibration generating part.

14. An angular velocity sensor according to claim 12, wherein the movable bi-directional and fixed bi-directional electrodes are part of the displacement detection part.

15. An angular velocity sensor according to claims 13 or 14, wherein: said vibration plate comprises an outer frame and a vibration element which is disposed inside said outer frame via a connection beam in such a manner that said vibration element can move in the Z direction; and said angular velocity sensor further comprises a Z-direction displacement detecting means formed with a movable electrode formed on said vibration element and a fixed electrode formed on said substrate such that said fixed electrode and said movable electrode face each other in spaced relationship, whereby said Z-direction displacement detecting means detects a displacement of said vibration element in the Z direction corresponding to a change in angular velocity applied to said vibration plate which is vibrated either in the X direction or in the Y direction by said vibration generating means.

* * * * *